(12) United States Patent
Nakashima et al.

(10) Patent No.: US 8,137,846 B2
(45) Date of Patent: Mar. 20, 2012

(54) NONAQUEOUS-ELECTROLYTE SECONDARY BATTERY

(75) Inventors: Satoshi Nakashima, Ibaraki (JP); Yasushi Usami, Shiga (JP); Akihiko Sakai, Shiga (JP); Manabu Hayashi, Tokyo (JP); Ryoichi Kato, Ibaraki (JP)

(73) Assignees: Mitsubishi Chemical Corporation, Tokyo (JP); Mitsubishi Plastics, Inc., Tokyo (JP)

( * ) Notice: Subject to any disclaimer, the term of this patent is extended or adjusted under 35 U.S.C. 154(b) by 0 days.

(21) Appl. No.: 11/453,006

(22) Filed: Jun. 15, 2006

(65) Prior Publication Data

US 2007/0048607 A1    Mar. 1, 2007

Related U.S. Application Data

(63) Continuation of application No. PCT/JP2004/018985, filed on Dec. 14, 2004.

(30) Foreign Application Priority Data

Dec. 15, 2003  (JP) .............. P. 2003-416761
Dec. 15, 2003  (JP) .............. P. 2003-416762
Feb. 10, 2004  (JP) .............. P. 2004-033617
Feb. 10, 2004  (JP) .............. P. 2004-033618
Feb. 10, 2004  (JP) .............. P. 2004-033619

(51) Int. Cl.
*H01M 2/16* (2006.01)
*H01M 2/14* (2006.01)

(52) U.S. Cl. .............. 429/247; 429/248; 429/231.8; 429/231.95

(58) Field of Classification Search .............. 429/247, 429/248, 251
See application file for complete search history.

(56) References Cited

U.S. PATENT DOCUMENTS

| | | | |
|---|---|---|---|
| 5,437,944 A | 8/1995 | Kita et al. | |
| 5,453,333 A * | 9/1995 | Takauchi et al. | 429/62 |
| 5,626,981 A * | 5/1997 | Simon et al. | 429/105 |
| 5,631,100 A | 5/1997 | Yoshino et al. | |
| 6,045,771 A * | 4/2000 | Matsubara et al. | 423/594.4 |
| 6,379,846 B1 | 4/2002 | Terahara et al. | |
| 6,447,958 B1 | 9/2002 | Shinohara et al. | |
| 6,627,346 B1 * | 9/2003 | Kinouchi et al. | 429/144 |
| 6,638,988 B2 * | 10/2003 | Takata et al. | 521/143 |
| 6,699,618 B2 * | 3/2004 | Noda et al. | 429/224 |
| 2001/0033822 A1 | 10/2001 | Ishii et al. | |
| 2002/0006376 A1 | 1/2002 | Ishii et al. | |
| 2002/0018926 A1 | 2/2002 | Shiga et al. | |
| 2002/0148723 A1 | 10/2002 | Takata et al. | |
| 2003/0022064 A1 | 1/2003 | Ishii et al. | |
| 2006/0001003 A1 | 1/2006 | Ishii et al. | |
| 2006/0024569 A1 * | 2/2006 | Hennige et al. | 429/144 |
| 2006/0093546 A1 | 5/2006 | Ishii et al. | |
| 2006/0099509 A1 | 5/2006 | Ishii et al. | |
| 2006/0159996 A1 | 7/2006 | Ishii et al. | |
| 2007/0117016 A1 | 5/2007 | Ishii et al. | |
| 2008/0274404 A1 | 11/2008 | Ishii et al. | |

FOREIGN PATENT DOCUMENTS

| | | |
|---|---|---|
| CA | 2 269 892 A1 | 10/1999 |
| CN | 1381515 A | 11/2002 |
| CN | 1430306 A | 7/2003 |
| CN | 1520621 A | 8/2004 |
| DE | 199 18 856 A1 | 11/1999 |
| EP | 0 486 704 A1 | 5/1992 |
| EP | 547237 A1 * | 6/1993 |
| EP | 0 603 397 A1 | 6/1994 |
| EP | 0918040 | 5/1999 |
| EP | 1 361 194 A1 | 11/2003 |
| JP | 63-276868 | 11/1988 |
| JP | 4-101357 | 4/1992 |
| JP | 5-13062 | 1/1993 |
| JP | 5-226004 | 9/1993 |
| JP | 08217451 A * | 8/1996 |
| JP | 9-204933 | 8/1997 |
| JP | 10-50287 | 2/1998 |
| JP | 2000-30686 | 1/2000 |
| JP | 2000-40499 | 2/2000 |
| JP | 2000-100472 | 4/2000 |
| JP | 2000208123 A * | 7/2000 |
| JP | 2000-223111 | 8/2000 |
| JP | 2001-15108 | 1/2001 |
| JP | 2001-135295 | 5/2001 |
| JP | 2001-164015 | 6/2001 |
| JP | 2001-213615 | 8/2001 |

(Continued)

OTHER PUBLICATIONS

IPDL Machine translation of JP 08-217451 A1.*
IPDL Machine translation of JP 2000-030686 A1.*
IPDL Machine translation of JP 2001-231615 A1.*
Partial IPDL Machine translation of JP 2003-217658 A1.*
IPDL Machine translation of JP 10-321258 A1.*
IPDL Machine Translation of the Claims of JP 2000-030686.*

(Continued)

*Primary Examiner* — Gregg Cantelmo
(74) *Attorney, Agent, or Firm* — Oblon, Spivak, McClelland, Maier & Neustadt, L.L.P.

(57) ABSTRACT

A subject for the invention is to improve the cycle characteristics of a high-capacity secondary battery containing an active material packed at a high density, by using a particulate active material having a low aspect ratio. The invention relates to a nonaqueous-electrolyte secondary battery comprising a negative electrode and a positive electrode each capable of occluding/releasing lithium, a separator, and a nonaqueous electrolyte solution comprising a nonaqueous solvent and a lithium salt, characterized in that the separator comprises a porous film made of a thermoplastic resin containing an inorganic filler, and at least either of the following is satisfied: the active material contained in the negative electrode is a particulate active material having an aspect ratio of from 1.02 to 3; and the active material contained in the positive electrode is a particulate active material having an aspect ratio of from 1.02 to 2.2.

26 Claims, No Drawings

FOREIGN PATENT DOCUMENTS

| | | |
|---|---|---|
| JP | 2002-25531 | 1/2002 |
| JP | 2002-25615 | 1/2002 |
| JP | 2002-88188 | 3/2002 |
| JP | 2002-128928 | 5/2002 |
| JP | 2002-175810 | 6/2002 |
| JP | 2002-201298 | 7/2002 |
| JP | 2002-208401 | 7/2002 |
| JP | 2002216757 A * | 8/2002 |
| JP | 2002-279973 | 9/2002 |
| JP | 2002-309024 | 10/2002 |
| JP | 2003-17050 | 1/2003 |
| JP | 2003-068360 | 3/2003 |
| JP | 2003-86248 | 3/2003 |
| JP | 2003-217656 | 7/2003 |
| JP | 2003-217658 | 7/2003 |
| JP | 2003-257478 | 9/2003 |
| JP | 2003-257479 | 9/2003 |
| JP | 2003-331825 | 11/2003 |
| JP | 2003-331923 | 11/2003 |
| JP | 2003-338317 | 11/2003 |
| WO | WO 91/20104 | 12/1991 |
| WO | WO 93/06628 | 4/1993 |
| WO | 98/59384 | 12/1998 |
| WO | WO 0159871 A1 * | 8/2001 |
| WO | WO 03/003489 A1 | 1/2003 |

OTHER PUBLICATIONS

IPDL Machine Translation of JP 2000-208123 (Jul. 2000).*
Office Action issued Jan. 14, 2011 in Korea Application No. 2006-7014229 (With English Translation).
Japanese Office Action issued Oct. 12, 2010, in Patent Application No. 2004-376962 (with English-language translation).

* cited by examiner

NONAQUEOUS-ELECTROLYTE SECONDARY BATTERY

This application is a Continuation application of PCT/JP04/018985 filed Dec. 14, 2004.

TECHNICAL FIELD

The present invention relates to a nonaqueous-electrolyte secondary battery. More particularly, the invention relates to a nonaqueous-electrolyte secondary battery which comprises a negative electrode and a positive electrode each capable of occluding/releasing lithium, a separator, and a nonaqueous electrolyte solution comprising a nonaqueous solvent and a lithium salt, and which has a high capacity and excellent cycle characteristics.

According to the invention, an excellent nonaqueous-electrolyte secondary battery can be further provided which has excellent rate characteristics in a low-temperature environment, is reduced in gas generation in repetitions of charge/discharge, and can secure battery safety during overcharge while retaining intact high-temperature storability.

The invention further relates to the nonaqueous-electrolyte secondary battery which has stable and satisfactory load characteristics and can be prevented from undergoing the deterioration caused by the so-called trickle charge, which is used for compensating for a capacity decrease resulting from self-discharge in batteries for personal computers or the like.

BACKGROUND ART

With the trend toward weight and size reduction in electrical products, lithium secondary batteries which are lightweight nonaqueous-electrolyte secondary batteries having a high energy density are used in a wide range of fields. A lithium secondary battery is generally constituted mainly of: a positive electrode obtained by forming an active-material layer containing a positive-electrode active material such as a lithium compound represented by lithium cobalt oxide on a current collector; a negative electrode obtained by forming an active-material layer containing a negative-electrode active material such as a carbon material capable of occluding/releasing lithium, which is represented by graphite or the like, on a current collector; a nonaqueous electrolyte solution prepared by dissolving an electrolyte such as a lithium salt, e.g., $LiPF_6$, usually in an aprotic nonaqueous solvent; and a separator comprising a porous polymer film.

It is known that in such secondary batteries, to heighten the packing density of an electrode active material is effective in improving battery performances including battery capacity. For example, patent document 1 describes a technique in which a negative-electrode active material such as, e.g., flaky graphite is rounded by a mechanochemical action to thereby enable the active material to be packed at a higher density and attain a higher capacity. Patent document 2 describes a technique in which lithium nickel cobalt oxide positive-electrode active-material particles whose secondary particles are spherical or ellipsoidal are used to improve high-load characteristics and low-temperature high-rate discharge characteristics.

Incidentally, the separators for use in lithium secondary batteries are required to satisfy the following and other requirements: not to inhibit ionic conduction between the two electrodes; to be capable of holding electrolyte solutions; and to have solvent resistance to electrolyte solutions. Porous polymer films made of thermoplastic resins such as polyethylene and polypropylene are mainly used. The following techniques have hitherto been known as processes for producing those porous polymer films.

(1) An extraction method which comprises adding to a polymeric material a plasticizer capable of being easily extracted/removed in a later step, molding the mixture, and thereafter removing the plasticizer with an appropriate solvent to make the porous structure (patent document 3).

(2) A stretching method which comprises molding a crystalline polymeric material and then selectively stretching the amorphous parts, which are structurally weak, to thereby form micropores (patent document 4).

(3) An interfacial separation method which comprises adding a filler to a polymeric material, molding the mixture, and thereafter conducting a stretching operation to cause separation at the interface between the polymeric material and the filler and thereby form microvoids (patent document 5).

However, the extraction method (1) necessitates treatment of a large amount of a waste liquid and hence has problems concerning both environment and profitability. In addition, since film shrinkage occurs in the extraction step and this makes it difficult to obtain an even film, this method further has a problem concerning productivity such as yield. The stretching method (2) necessitates a long-term heat treatment because a pore diameter distribution is regulated by regulating the crystalline phase/amorphous phase structure before stretching. This method hence has a problem concerning productivity.

In contrast, the interfacial separation method (3) generates almost no waste liquid or the like and is an excellent method from the standpoints of both environment and profitability. Furthermore, since separation at the interface between the polymeric material and the filler can be easily caused by a stretching operation, a porous film can be obtained without necessitating a pretreatment such as a heat treatment. This method hence is a technique excellent also from the standpoint of productivity.

However, it has commonly been thought that the separators containing a filler are poor in the property of coming into tight contact with electrodes because of the presence of the filler projecting from the surface to cause unevenness in interelectrode resistance due to uneven electrode spacings and are apt to generate lithium dendrites or the like and inferior in safety. Because of this, there have been no cases where the filler-containing separator produced by the method (3) described above has been put to practical use.

In patent document 1, which was cited above, the term separator is merely given in paragraph [0048]. In patent document 2 also, separators are described in paragraph [0041] only as microporous films or nonwoven fabrics made of polypropylene, polyethylene, or a copolymer. In general, these microporous polyolefin separators are industrially produced by the extraction method (1). or stretching method (2) described above. In addition, patent documents 1 and 2 include no statement concerning influences of the separators in the case where a specific active material such as those shown above is used.

Furthermore, it has commonly been thought that the separators containing a filler are poor in the property of coming into tight contact with electrodes because of the presence of the filler projecting from the surface to cause unevenness in interelectrode resistance due to uneven electrode spacings and are apt to generate lithium dendrites or the like and inferior in safety. Because of this, there have been no cases where the filler-containing separator produced by the method (3) described above has been put to practical use.

DISCLOSURE OF THE INVENTION

However, the higher the packing density of an active material, the more the lithium-occluding and lithium-releasing battery reactions accompanying charge/discharge proceed and the more the side reactions of the battery reactions produce harmful influences. These side reactions are reactions in which the electrolyte solution and the electrode mix compositions (ones comprising an active material and a binder and optionally further containing a conductive material, etc.) are electrochemically decomposed to generate organic substances and inorganic substances. Such products of the side reactions accumulate on the electrode surfaces and on the surface of or in inner pores of the separator to cause clogging and reduce the diffusion of lithium ions. As a result, the battery has been apt to have increased internal resistance and reduced cycle characteristics. Furthermore, there has been a problem that due to the action of repetitions of the expansion and contraction of the active materials with charge/discharge reactions, the electrolyte solution is forced out of the separator and comes to be present in uneven concentrations in the battery element, resulting in reduced cycle characteristics. In addition, since products of the side reactions come to have the function of bonding an electrode surface to a separator surface, the action of repetitions of the expansion and contraction of the active materials with charge/discharge reactions weakens interparticulate bonding in the electrode mix layers. This also has been apt to increase the internal resistance of the battery and reduce cycle characteristics.

Accordingly, an object of the invention is to improve the cycle characteristics of a high-capacity secondary battery containing an active material packed at a high density, by using a particulate active material having a low aspect ratio.

As a result of intensive investigations, the present inventors have found that in a nonaqueous-electrolyte secondary battery employing a particulate active material having a low aspect ratio, cycle characteristics can be improved when a porous film made of a thermoplastic resin containing an inorganic filler is used as a separator in combination with the active material. The invention has been thus completed.

Namely, the invention has the following constitutions.
(1) A nonaqueous-electrolyte secondary battery comprising a negative electrode and a positive electrode each capable of occluding/releasing lithium, a separator, and a nonaqueous electrolyte solution comprising a nonaqueous solvent and a lithium salt, wherein the separator comprises a porous film made of a thermoplastic resin containing an inorganic filler, and at least either of the following is satisfied: the active material contained in the negative electrode is a particulate active material having an aspect ratio of from 1.02 to 3; or the active material contained in the positive electrode is a particulate active material having an aspect ratio of from 1.02 to 2.2.
(2) The nonaqueous-electrolyte secondary battery according to the above (1), wherein the negative-electrode active material has an aspect ratio of from 1.02 to 3.
(3) The nonaqueous-electrolyte secondary battery according to the above (1) or (2), wherein the positive-electrode active material has an aspect ratio of from 1.02 to 2.2.
(4) The nonaqueous-electrolyte secondary battery according to anyone of the above (1) to (3), wherein the negative-electrode active material has a tap density of 0.7 g/cm$^3$ or higher.
(5) The nonaqueous-electrolyte secondary battery according to any one of the above (1) to (4), wherein the negative-electrode active material is a carbon material.
(6) The nonaqueous-electrolyte secondary battery according to any one of the above (1) to (5), wherein the positive-electrode active material has a tap density of 1.4 g/cm$^3$ or higher.
(7) The nonaqueous-electrolyte secondary battery according to any one of the above (1) to (6), wherein the positive-electrode active material is a lithium/transition metal composite oxide.
(8) The nonaqueous-electrolyte secondary battery according to any one of the above (1) to (7), wherein the separator has a thickness of from 5 µm to 100 µm, a porosity of from 30% to 80%, an average pore diameter as provided for in ASTM F316-86 of from 0.05 µm to 10 µm, a Gurley air permeability as provided for in JIS P8117 of from 20 sec/100 cc to 700 sec/100 cc, and an average rate of change in retained-liquid amount of 15%/min or lower.

The mechanism by which the use of a specific separator in the invention in combination with a secondary battery employing a particulate active material having a low aspect ratio improves cycle characteristics has not been elucidated in detail. However, the following is presumed.

Namely, as stated above, the causes of a decrease in cycle characteristics in secondary batteries employing a particulate active material having a low aspect ratio are thought to be the separator clogging caused by side-reaction products generated due to the high-density packing of the particulate active material having a low aspect ratio and the localization of the electrolyte solution and the increase in internal battery resistance both attributable to the expansion/contraction of the active material.

On the other hand, no investigation is made on a separator in patent document 1. In patent document 2, a microporous film obtained by the extraction method or stretching method is used as a separator. However, it is difficult in such film-forming techniques to obtain a large pore diameter such as that which will be described later, and that microporous film is apt to be clogged by side-reaction products. This separator further has a high rate of change in retained-liquid amount and is poor also in the ability to hold an electrolyte solution therein. Furthermore, since the surface is smooth, bonding between an electrode surface and the separator surface by side-reaction products is apt to occur and the action of repetitions of the expansion and contraction of the active material with charge/discharge reactions weakens interparticulate bonding in the electrode mix layer. This has been apt to increase internal battery resistance and reduce cycle characteristics.

In contrast, the inorganic-filler-containing separator to be used in the invention can be easily regulated so as to have a sufficiently enlarged pore diameter as compared with those obtained by the extraction method and stretching method. This separator hence is less apt to be clogged by side-reaction products. This separator further has satisfactory liquid retentivity and can hence prevent an electrolyte solution from localizing.

The reasons why the separator to be used in the invention has excellent liquid retentivity are thought to be as follows. Namely, the movement of an electrolyte solution in a separator can be regarded as the so-called capillary flow in which a liquid penetrates through minute pores. In capillary flow, it is thought that the smaller the pore diameter, the larger the penetration distance and the more the liquid is hence apt to penetrate. Conversely, however, it is thought that when the liquid comes out due to, e.g., an external force, poor liquid retentivity results due to the penetrability. Compared to separators produced by the methods (1) and (2) described above, such as that used in patent document 2, the filler-containing separator to be used in the invention has a large pore diameter and is slightly inferior in liquid penetrability. It is, however, thought that once a liquid has penetrated, the liquid is less apt to move and is hence apt to be held in the film. Furthermore, since the separator as a whole has an increased permittivity due to the filler contained therein, the filler has an improved chemical affinity for the electrolyte solution, which is a polar solvent, due to interaction between these. This improved affinity is thought to bring about the effect of heightening the ability of the separator to retain the electrolyte solution. Moreover, the separator to be used in the invention has recesses and protrusions on the surfaces thereof because of the presence of the filler and, hence, a gap is formed between each electrode plate and the separator in the battery, whereby a larger amount of the electrolyte solution can be held in this gap. This also is thought to be effective in preventing the localization and deficiency of the electrolyte solution.

In addition, in the separator to be used in the invention, the bonding function of side-reaction products is reduced by the effect of the inorganic filler partly exposed on the separator surfaces. Thus, the decrease in interparticulate bonding in the electrode mix layer caused by the action of repetitions of the expansion and contraction of the active material with charge/discharge reactions can be prevented and resistance can be prevented from increasing. This also is thought to be effective in improving cycle characteristics.

As described above, a specific separator having a large pore diameter and exceedingly satisfactory liquid retentivity and further having surface recesses and protrusions formed by an inorganic filler is used in the invention in a secondary battery containing a particulate active material having a low aspect ratio and packed at a high density. Thus, separator clogging by side-reaction products, the state of being deficient in an electrolyte solution in the battery element, and a decrease in interparticulate bonding in the active-material layer are effectively prevented in the secondary battery and the cycle characteristics thereof are prevented from decreasing.

Incidentally, as stated above, it is thought that separators containing a filler are poor in the property of coming into tight contact with electrodes because of the presence of the filler projecting from the surface to cause unevenness in interelectrode resistance due to uneven electrode spacings and are apt to generate lithium dendrites or the like and inferior in safety. There have been no cases where a filler-containing separator has been put to practical use. In patent document 2 also, such a microporous film containing no filler is used as a separator. However, the separator comprising such a microporous film cannot attain the properties possessed by the separator to be used in the invention, and the effects of the invention cannot be obtained therewith.

In the invention, a specific separator which has not been employed hitherto is incorporated into a secondary battery employing a particulate active material having a low aspect ratio, whereby excellent effects can be obtained by the mechanism described above.

According to the invention, the cycle characteristics of a lithium secondary battery employing a particulate active material having a low aspect ratio can be improved. Because of this, a nonaqueous-electrolyte secondary battery can be realized which not only has an increased capacity attained with a particulate active material having a low aspect ratio and packed at a high density, but also has satisfactory cycle characteristics.

In the invention, the nonaqueous-electrolyte secondary battery further preferably has a constitution selected from the following (i) to (iv).

Namely, preferred constitutions are:
(i) one in which the nonaqueous electrolyte solution contains a film-forming agent;
(ii) a nonaqueous-electrolyte secondary battery characterized in that the nonaqueous electrolyte solution contains at least one chain carbonate represented by the following formula (I):

$$ROCOOCH_3 \qquad (I)$$

(wherein R represents a methyl group or an ethyl group);
(iii) one in which the nonaqueous electrolyte solution contains at least one aromatic compound having an exothermic property of 1.5 or higher; and
(iv) one in which the amount of water contained in the battery is 200-500 ppm in terms of water concentration in the electrolyte solution in the battery.

Those are explained below in order.

Next, a summary of the second embodiment of the invention is as follows.

(9) The nonaqueous-electrolyte secondary battery according to the above (1), wherein the nonaqueous electrolyte solution contains a film-forming agent.
(10) The nonaqueous-electrolyte secondary battery according to the above (9), wherein the film-forming agent comprises at least one member selected from the group consisting of carbonates having an ethylenically unsaturated bond and carboxylic acid anhydrides.
(11) The nonaqueous-electrolyte secondary battery according to the above (9) or (10) above, wherein the content of the film-forming agent in the nonaqueous electrolyte solution is 0.01-10% by weight.
(12) The nonaqueous-electrolyte secondary battery according to any one of the above (9) to (11), wherein the film-forming agent is vinylene carbonate.

The mechanism of the effect brought about in the invention by a combination further with a nonaqueous electrolyte solution containing a film-forming agent has not been elucidated in detail. However, the following is presumed.

Namely, as stated above, the incorporation of a film-forming agent in the nonaqueous electrolyte solution results in the formation of a passivated film on the surface of the negative electrode to prevent the nonaqueous electrolyte solution from decomposing, whereby the cycle characteristics of the secondary battery can be improved. However, the battery comes to have a considerably increased internal resistance at low temperatures due to the film formed by the film-forming agent on the negative-electrode surface, and this is thought to be a cause of the deterioration of rate characteristics. In the invention, a film-forming agent effective in improving the cycle characteristics of a secondary battery is used in combination with the specific separator, and the increase in internal battery resistance attributable to the film-forming agent is countervailed by the internal-battery-resistance-reducing effect of this separator to thereby maintain rate characteristics in a low-temperature environment.

The reasons why the separator to be used in the invention is effective in reducing the internal battery resistance are as follows. Namely, of the methods (1) to (3) described above as processes for separator production, the extraction method (1) has a drawback that sufficiently large pores cannot be formed through extraction or through extraction and subsequent stretching because it is necessary to select a plasticizer having satisfactory compatibility with the polymeric material and, hence, the separator obtained has increased electrical resistance. Although a technique in which a poorly compatible plasticizer is added to form large pores is known, molding in this method is unstable and a film having satisfactory properties is difficult to obtain. Whichever method is used, it is necessary to treat a large amount of a waste liquid in the extraction step. These two methods are hence undesirable also from the standpoint of profitability. In the stretching method (2), high-ratio stretching is difficult because only the amorphous parts present among crystal domains are selectively stretched. Because of this, the stretching method has a drawback that it is difficult to obtain a large pore diameter and the separator obtained has increased electrical resistance. In addition, a long-term heat treatment is necessary for regulating the crystalline phase. This method hence has low productivity and is undesirable also from the standpoint of profitability.

In contrast, the separator to be used in the invention, which comprises a porous film made of a thermoplastic resin containing an inorganic filler, can be easily produced as a porous film having a relatively large pore diameter by, e.g., the interfacial separation method in the manner which will be described later. Such a separator having a large pore diameter has a high degree of pore interconnection and is effective in reducing the internal resistance of the battery.

Incidentally, patent document 7 includes a statement to the effect that a nonaqueous electrolyte solution containing vinylene carbonate is used. This nonaqueous electrolyte solution is thought to function by a mechanism in which the vinylene carbonate is reduced to thereby form a passivated layer on the surface of the negative electrode and this layer constitutes a physical barrier which inhibits the electrolyte solution from decomposing. Patent document 7 is intended to improve the charge/discharge efficiency and cycle characteristics of a battery based on this effect oaf the vinylene carbonate.

However, as shown in non-patent document 1, the technique disclosed in patent document 7 has had a problem that the discharge capacity as measured when the battery is discharged at a high current in a low-temperature environment (this discharge capacity is hereinafter referred to as "rate characteristics") is low. This has been demonstrated also by Comparative Examples 2-1 and 2-2, which will be given later. The reason for the low rate characteristics is thought to be that the passivated film formed on the surface of the negative electrode considerably increases the internal resistance of the battery especially at low temperatures.

Furthermore, a summary of the third embodiment of the invention is as follows.

(13) The nonaqueous-electrolyte secondary battery according to the above (1), wherein the nonaqueous electrolyte solution contains at least one chain carbonate represented by the following formula (I):

$$ROCOOCH_3 \qquad (I)$$

(wherein R represents a methyl group or an ethyl group).

(14) The nonaqueous-electrolyte secondary battery according to the above (13), wherein the lithium salt is a fluorine-containing lithium salt and the nonaqueous solvent contains at least one cyclic carbonate.

(15) The nonaqueous-electrolyte secondary battery according to the above (13) or (14), wherein the content of the chain carbonate represented by formula (I) in the nonaqueous electrolyte solution is 5-95% by volume.

The mechanism of the effect brought about in the invention by a combination further with a nonaqueous electrolyte solution containing at least one chain carbonate represented by formula (I) has not been elucidated in detail. However, the following is presumed.

Namely, the chain carbonate represented by formula (I) forms a film of good quality on the surface of the negative electrode and produces the excellent effect of improving cycle characteristics. However, since this chain carbonate contains methyl groups, it is slightly inferior from the standpoint of unsusceptibility to oxidation and is apt to generate a gas, e.g., $CO_2$, upon contact with an oxidized separator. However, the separator to be used in the invention has many filler particles on the separator surface because it contains an inorganic filler, and the presence of these particles considerably reduces the area in which the base resin of the separator comes into direct contact with the positive-electrode layer. It is presumed that the oxidation of the separator by the positive electrode is hence prevented and the effect of inhibiting gas generation is obtained.

In non-patent document 2, there is a report that when a nonaqueous electrolyte solution containing a methyl alkyl carbonate represented by the formula $ROCOOCH_3$ (R is an alkyl group) as a nonaqueous solvent ingredient is used, then a stable film is formed on the surface of the negative electrode to improve the cycle characteristics of the secondary battery. The carbonates used in this technique are that wherein R is methyl (i.e., the $ROCOOCH_3$ is dimethyl carbonate, which is referred to as "DMC" hereinafter) and that wherein R is ethyl (i.e., the $ROCOOCH_3$ is ethyl methyl carbonate, which is referred to as "EMC" hereinafter).

However, lithium secondary batteries employing DMC or EMC as a nonaqueous solvent for the nonaqueous electrolyte solution are apt to generate a larger amount of a gas within the battery in the course of repetitions of charge/discharge as shown in Comparative Example 3-1 and Comparative Example 3-2, which will be given later, and this is apt to be a cause of battery expansion.

Patent document 8 includes statements to the following effects: a cause of gas generation in a battery is the oxidation of a porous film made of polyethylene and a separator having a porous polypropylene film disposed on the side facing the positive electrode is used; although separators are required to have the so-called shutdown function, i.e., the property of closing the pores to terminate the battery reactions in case of battery reaction abnormality, separators made of polypropylene have a shutdown temperature higher by as much as about 30° C. than that of separators made of polyethylene and are inferior in safety; and a multilayer film composed of two or more layers comprising a polyethylene layer and a polypropylene layer is hence applied as a separator to a nonaqueous-electrolyte secondary battery employing a mixed solvent comprising ethylene carbonate and diethyl carbonate.

However, the production of a multilayer film composed of two or more layers necessitates a complicated process as compared with the production of single-layer films and is undesirable also from the standpoint of cost. Furthermore, there is a possibility that when two layers are laminated to each other, the porous structure of the separator might deform (collapse) to become unable to perform the function of a separator.

Incidentally, in patent document 8 cited above, any process for producing the separator comprising a multilayer film is not specifically described, and the only statement given therein concerning the separator is one to the effect that the separator preferably is one in which at least one layer of the multilayer film is a biaxially stretched single-layer film or one constituted of at least two uniaxially stretched single-layer films superposed so that the stretch directions for these films cross each other. However, in this patent document 8, the constituent layers are described only as "a polypropylene layer" and "a polyethylene layer" and no statement is given on a filler. Even a statement which suggests a filler is not given therein. Consequently, the separator described in patent document 8 can be regarded at least as one produced by a method other than the interfacial separation method.

In addition, the lithium secondary battery employing DMC or EMC as a nonaqueous solvent for the nonaqueous electrolyte solution so as to have improved cycle characteristics has a problem that a larger amount of a gas is apt to generate in the course of repetitions of charge/discharge and the battery expands due to this, as stated above. Although a technique for preventing the gas generation by using a separator comprising a multilayer film composed of two or more layers including a polypropylene layer and a polyethylene layer has been proposed, use of such a separator comprising a multilayer film is undesirable also from the standpoint of cost.

Furthermore, a summary of the fourth embodiment of the invention is as follows.

(16) The nonaqueous-electrolyte secondary battery according to the above (1), wherein the nonaqueous electrolyte solution contains at least one aromatic compound having an exothermic property of 1.5 or higher.

(17) The nonaqueous-electrolyte secondary battery according to the above (16), wherein the aromatic compound having an exothermic property of 1.5 or higher is at least one member selected from the group consisting of cyclohexylbenzene, cyclohexylfluorobenzene, biphenyl, fluorobiphenyl, and diphenyl ether.

(18) The nonaqueous-electrolyte secondary battery according to the above (16) or (17), wherein the aromatic compound having an exothermic property of 1.5 or higher is contained in an amount of 0.1-8% by weight based on the nonaqueous electrolyte solution.

The mechanism of the effect brought about in the invention by a combination further with a nonaqueous electrolyte solution containing an aromatic compound having an exothermic property of 1.5 or higher has not been elucidated in detail. However, the following is presumed.

Namely, as stated above, the incorporation of an overcharge inhibitor into a nonaqueous electrolyte solution considerably increases the internal resistance of the battery during overcharge through the formation of a polymer film on the surface of the positive electrode or causes the circuit breaker in the battery can to work based on the gas generating during the polymerization, whereby the safety of the secondary battery can be improved. It is, however, thought that the formation of this polymer film partly proceeds undesirably even when the battery in a charged state is stored at a high temperature and this film clogs pores of the separator and thereby increases the internal resistance of the battery, resulting in a reduced battery discharge capacity and impaired rate characteristics. This tendency is pronounced especially when an overcharge inhibitor comprising an aromatic compound having an exothermic property of 1.5 or higher is used.

In contrast, the porous film to be used as a separator in the invention, which is made of a thermoplastic resin containing an inorganic filler, can be easily produced as a porous film having a relatively large pore diameter by, e.g., the interfacial separation method in the manner which will be described later. Such a separator having a large pore diameter has a high degree of pore interconnection, is less apt to suffer clogging by a polymer of the overcharge inhibitor, and is effective in inhibiting the internal resistance of the battery from increasing. Furthermore, the presence of the inorganic filler reduces the area in which the positive-electrode active material comes into contact with the separator, making it possible to form a slight gap between the positive-electrode active material and the separator. This also is thought to enable the separator to be less clogged. The reason for this may be as follows. There is a possibility that the partial polymerization of the overcharge inhibitor in a battery which is not in an overcharged state might proceed undesirably by the following mechanism. First, the separator is oxidized by the positive-electrode active material. The overcharge inhibitor comes into contact with the oxidized separator and is thus oxidized, whereby the polymerization reaction partly proceeds. That the area in which the separator is in contact with the positive-electrode active material is small is effective also from the standpoint of inhibiting separator oxidation.

Incidentally, as stated above, it is thought that separators containing a filler are poor in the property of coming into tight contact with electrodes because of the presence of the filler projecting from the surface to cause unevenness in interelectrode resistance due to uneven electrode spacings and are apt to generate lithium dendrites or the like and inferior in safety. There have been no cases where a filler-containing separator has been put to practical use. In patent document 9 also, such a microporous polyolefin film containing no filler is used as a separator. However, the separator comprising such a microporous polyolefin film cannot attain the properties possessed by the separator to be used in the invention, and the effects of the invention cannot be obtained therewith.

In the invention, a specific separator which has not been employed hitherto is used in combination with a specific overcharge inhibitor, whereby excellent effects can be obtained by the mechanism described above.

When a nonaqueous-electrolyte secondary battery is overcharged, excessive lithium release and excessive lithium occlusion occur at the positive electrode and the negative electrode, respectively, with the progress of the overcharged state. In some cases, lithium metal deposits. The positive electrode and negative electrode in such a state each are in a thermally unstable state, and are apt to cause the electrolyte solution to decompose and abruptly heat up, resulting in abnormal heat buildup of the battery and impaired safety of the battery. This becomes remarkable especially as the energy density of the nonaqueous-electrolyte secondary battery increases.

In patent document 9 are proposed: a method of protecting a battery in an overcharged state by using a small amount of biphenyl, a 3-R-thiophene (R is bromine, chlorine, or fluorine), furan, or 3-chlorothiophene as an additive; and batteries containing these additives. In this technique, at voltages not lower than the maximum operating voltage for the battery, the additive (hereinafter, the additive for heightening the safety of a battery in an overcharged state is often referred to as "overcharge inhibitor") polymerizes to thereby increase the internal resistance of the battery and thus secure the safety of the battery during overcharge.

However, the statements given in patent document 9 concerning separators are limited to one to the effect that a microporous polyolefin film is used as a separator and one to the effect that polypropylene and polyethylene are used as materials therefor. The separators specifically described in patent document 9 each differ from a porous film containing a filler. In general, this microporous polyolefin film is industrially produced by the extraction method (1) or stretching method (2) described above.

With the recent trend toward a higher level of performances desired on the market, secondary batteries have come to be required to have their performances even in various use environments. For example, the following are important properties as shown in Examples which will be given later. Even when a secondary battery is stored at as high as 60° C., the battery not only retains a large discharge capacity after the storage but also has a low overvoltage and a high discharge capacity during high-current discharge, i.e., to retain satisfactory rate characteristics after high-temperature storage.

However, the technique disclosed in patent document 9, in which an overcharge inhibitor is used in order to protect a battery in an overcharged state, has a problem that part of the overcharge inhibitor undesirably reacts even in the high-temperature storage of the battery in a charged stage and the polymer yielded by the reaction causes separator clogging, resulting in reduced battery characteristics.

Namely, the incorporation of an overcharge inhibitor into a nonaqueous electrolyte solution considerably increases the internal resistance of the battery during overcharge through the formation of a polymer film on the surface of the positive electrode or causes the circuit breaker in the battery can to work based on the gas generating during the polymerization, whereby the safety of the secondary battery can be improved. However, the formation of this polymer film partly proceeds undesirably even when the battery in a charged state is stored at a high temperature. On the other hand, in patent document 9, a microporous polyolefin film obtained by the extraction method or stretching method is used as a separator as stated above. However, the porous film obtained by such a method not only has an exceedingly small pore diameter but also has an exceedingly smooth surface and is apt to come into tight contact with an electrode active material. Consequently, this porous film is more apt to accelerate the polymerization of the overcharge inhibitor through separator oxidation as will be described later. Because of these, such a microporous polyolefin film separator is apt to be clogged by a polymer of the overcharge inhibitor and, hence, secondary batteries employing this separator come to have impaired battery characteristics through high-temperature storage. Especially when a nonaqueous electrolyte solution containing an overcharge inhibitor comprising an aromatic compound having an exothermic property of 1.5 or higher is used, secondary batteries employing a microporous polyolefin film as a separator cannot have satisfactory rate characteristics after high-temperature storage, as shown in Comparative Examples 4-1 and 4-2, which will be given later.

Furthermore, a summary of the fifth embodiment of the invention is as follows.
(19) The nonaqueous-electrolyte secondary battery according to the above (1), wherein the amount of water contained in the battery is 200-500 ppm in terms of water concentration in the electrolyte solution in the battery.

In the invention, the present inventors have further found that the water which is carried in a battery mainly by the separator and the electrodes during battery fabrication exerts a considerable influence on the surface resistance of the electrodes and that a battery having stable and satisfactory load characteristics is obtained by regulating the amount of the water so as to be in a specific range. The inventors have furthermore found that the secondary battery of the invention is effective also in the prevention of the battery performance deterioration caused by the so-called trickle charge, which is used for compensating for a capacity decrease resulting from self-discharge in batteries for personal computers or the like, although the reasons for this have not been elucidated.

Incidentally, patent document 6 describes a technique in which a porous film containing inorganic particles is used as the separator of a lithium secondary battery for the purpose of preventing the phenomenon in which fluorine is generated by the reaction of the water present in a battery with a fluorine-containing electrolyte and the battery capacity is reduced by the deterioration of the electrolyte solution and electrode plates by the fluorine generated. In this technique, inorganic particles reduced in water adsorption and having an equilibrium water content lower than 4% are used so as to minimize the amount of the water to be carried in by the separator.

However, investigations made by the present inventors revealed that it is not true that the smaller the water amount in a battery, the better. The investigations further revealed that when water is present in an amount in a specific range rather than eliminated, the surface resistance of the electrodes decreases and load characteristics improve. Namely, this invention is intended to positively utilize water, which has been regarded as an ingredient which should be eliminated as much as possible, to thereby improve performances. The invention is further intended to regulate not only the amount of water possessed by the separator but also all water to be carried in the battery. The invention utterly differs in idea from the technique disclosed in patent document 6, which is intended to merely minimize water amount.

In the invention, the term "water amount in a battery" means not the water concentration of the electrolyte solution to be used for battery fabrication but the total amount of all water which was contained in the separator, electrode materials, electrolyte solution, battery fabrication atmosphere, etc., has been carried in the battery, and is contained in the battery obtained as a product. Consequently, the water amount in a battery can be determined from the total amount of the water which is adherent to or contained in the materials to be used for battery fabrication and is to be carried in the battery as a product and the water which is present as moisture in the fabrication atmosphere and is to be carried in the battery. However, since the water which has been thus carried in the battery obtained as a product mostly collects in the electrolyte solution, the water amount can be determined by disassembling the fabricated battery to take the electrolyte solution out of the battery and measuring the water concentration thereof.

Incidentally, the water which is to be carried in a battery is mainly attributable to the separator and the electrode materials. Namely, the water content of the electrolyte solution has generally been reduced to several tens of ppm or lower so as to prevent the decomposition of the salt contained therein and, hence, the amount of the water which is contained in the electrolyte solution and is carried in the battery as a product is generally almost nil.

The reasons why the presence of a specific amount of water in the battery reduces the surface resistance of the electrodes in the invention have not been elucidated. It is, however, presumed that some by-product (hereinafter sometimes referred to as "contributive substance") yielded by the reaction of water with a salt in the electrolyte solution contributes to the reduction in the resistance. The reason why this effect is produced only when the water amount is in a specific range is presumed to be as follows. The proportion of such a contributive substance yielded is usually low as compared with the hydrofluoric acid generated by the reaction of water with a salt contained in the electrolyte solution and, hence, the amount of the contributive substance is insufficient for producing a sufficient effect when the water content is below 200 ppm. Conversely, too large water amounts are thought to be undesirable because the active materials are deteriorated by hydrofluoric acid and an increase in resistance occurs due to the generation of lithium fluoride.

Furthermore, the reasons why the battery of the invention is effective in inhibiting the battery deterioration, i.e., the increase in self-discharge amount, caused by trickle charge have not been elucidated in detail. However, it is presumed that some by-product contributes to the inhibition like the contributive substance effective in reducing the surface resistance of the electrodes.

Trickle current herein is defined as the value of charge current as measured when the battery is subjected to 4.2-V CCCV continuous charge for 672 hours in an atmosphere of 60° C.

[Patent Document 1]
   JP-A-10-330107
[Patent Document 2]
   JP-A-11-288716
[Patent Document 3]
   JP-A-7-029563
[Patent Document 4]
   JP-A-7-304110
[Patent Document 5]
   JP-A-2002-201298
[Patent Document 6]
   JP-A-2000-208123
[Patent Document 7]
   JP-A-8-45545
[Patent Document 8]
   JP-A-2001-273880
[Patent Document 9]
   JP-A-9-106835
[Non-Patent Document 1]
   *J. Power Sources*, 119-121, (2003), 943
[Non-Patent Document 2]
   *Electrochemical and Solid-State Letters*, 2 (5) 212 (1999)

BEST MODE FOR CARRYING OUT THE INVENTION

Embodiments of the invention will be explained below in detail. However, the invention should not be construed as being limited to the following embodiments, and various modifications can be made within the scope of the spirit of the invention.

The nonaqueous-electrolyte secondary battery of the invention comprises a negative electrode and a positive electrode each capable of occluding/releasing lithium, the specific separator which will be described below in detail, and a nonaqueous electrolyte solution comprising a nonaqueous solvent and a lithium salt. The battery employs a specific particulate active material having a low aspect ratio as the active material of the positive electrode and/or the negative electrode.

[Separator]

<Components, Properties, etc. of the Separator>

The thermoplastic resin to be used as the base resin of the porous film constituting the separator in the invention is not particularly limited as long as the inorganic filler which will be described later can be evenly dispersed therein. Examples thereof include polyolefin resins, fluororesins, styrene resins including polystyrene, ABS resins, vinyl chloride resins, vinyl acetate resins, acrylic resins, polyamide resins, acetal resins, and polycarbonate resins. These thermoplastic resins including polyolefin resins may be used alone or as a mixture of two or more thereof.

Polyolefin resins are especially preferred of those resins because they have an excellent balance among heat resistance, solvent resistance, and flexibility. Examples of the polyolefin resins include ones comprising as the main component a homopolymer of an olefin such as ethylene, propylene, 1-butene, 1-hexene, 1-octene, or 1-decene or a copolymer of ethylene, propylene, 1-butene, 1-hexene, 1-octene, or 1-decene with one or more other monomers, e.g., 4-methyl-1-pentene or vinyl acetate. Specific examples thereof include low-density polyethylene, linear low-density polyethylene, high-density polyethylene, polypropylene, crystalline ethylene/propylene block copolymers, polybutene, and ethylene/vinyl acetate copolymers. It is preferred in the invention to use a polyethylene or polypropylene among those polyolefin resins.

The weight-average molecular weight of such a thermoplastic resin may be such that the lower limit thereof is generally about 50,000 or higher, especially about 100,000 or higher, and the upper limit thereof is generally about 500,000 or lower, preferably about 400,000 or lower, more preferably about 300,000 or lower, especially about 200,000 or lower. In case where the weight-average molecular weight thereof exceeds the upper limit, the resin has an increased melt viscosity besides being reduced in flowability due to the addition of a filler thereto. This resin is hence difficult to melt-mold. Such a resin is undesirable also because even when a molding is obtained therefrom, a filler is not evenly dispersed in the resin and pore formation by interfacial separation is uneven. Weight-average molecular weights thereof lower than the lower limit are undesirable because mechanical strength decreases.

Examples of the inorganic filler contained in the porous polymer film according to the invention include calcium carbonate, magnesium carbonate, barium carbonate, talc, clay, mica, kaolin, silica, hydrotalcite, diatomaceous earth, calcium sulfate, magnesium sulfate, barium sulfate, aluminum hydroxide, magnesium hydroxide, calcium oxide, magnesium oxide, titanium oxide, alumina, zinc oxide, zeolites, and glass powders. Barium sulfate and alumina are especially preferred of these because they do not decompose the carbonate-based organic electrolyte solution for use in the lithium secondary battery.

The inorganic filler to be contained in the porous polymer film according to the invention preferably is one having the property of not decomposing the carbonate-based organic electrolyte solution for use in the lithium secondary battery. Examples of such fillers include sparingly water-soluble sulfates and alumina. Especially preferred is barium sulfate. The term "sparingly water-soluble" herein means to have a solubility in 25° C. water of 5 mg/L or lower.

Carbonates including calcium carbonate, titanium oxide, silica, and the like, which are generally used frequently as fillers, are undesirable because these fillers cause decomposition of a component of the nonaqueous electrolyte solution of the lithium secondary battery. The term "decomposition of a component of the organic electrolyte solution" herein is defined as the phenomenon in which when an electrolyte solution comprising a 1 M $LiPF_6$ solution in EC/EMC=3/7 (by volume) mixed nonaqueous solvent is held at 85° C. for 72 hours after a filler is added thereto in an amount of 0.5 g per mL of the electrolyte solution, then the lithium ion concentration in the electrolyte solution decreases to 0.75 mmol/g or lower through the holding. The amount of lithium ions is determined by ion chromatography. Throughout the 72-hour holding, the electrolyte solution should be kept in a sealed vessel so as to prevent contact with the ambient air. This is because the decomposition of components of the electrolyte solution proceeds through reaction with water present in the air.

In the following table are shown the results of an examination in which various fillers were added to an electrolyte solution (1 M $LiPF_6$/[(EC+EMC) (3:7 by volume)]) and the resultant mixtures were held under the conditions shown above. It can be seen that compared to the ion composition of the electrolyte solution to which no filler was added, barium sulfate and alumina showed almost no change in composition and are suitable fillers for use in the invention. In contrast, in the case of the carbonates, such as calcium carbonate and lithium carbonate, or of silica and titanium oxide, a considered decrease in lithium ion amount or an increase in fluorine ion amount due to the generation of hydrofluoric acid were observed. It can hence be seen that these fillers are undesirable for use in the invention.

TABLE 1

| | | | Found value in component analysis | | | |
|---|---|---|---|---|---|---|
| | | | Li (mmol/ g) | $PF_6$ (mmol/ g) | F (mmol/ g) | $PO_2F_2$ (mmol/ g) |
| Blank (electrolyte solution containing no inorganic filler added) | | | 0.82 | 0.82 | 0.01 | <0.01 |
| Electrolyte solution containing inorganic filler added | Kind of inorganic filler | $BaSO_4$ | 0.81 | 0.81 | 0.03 | 0.03 |
| | | $Al_2O_3$ | 0.82 | 0.82 | 0.01 | <0.01 |
| | | $CaCO_3$ | 0.48 | 0.01 | 1.6 | 0.59 |
| | | $Li_2CO_3$ | 0.24 | 0.00 | 0.01 | 0.35 |
| | | $SiO_2$ | 0.30 | 0.01 | 0.15 | 0.49 |
| | | $TiO_2$ | 0.68 | 0.66 | 0.45 | 0.07 |

The particle diameter of the inorganic filler is preferably such that the lower limit of the number-average particle diameter thereof is generally 0.01 μm or larger, preferably 0.1 μm or larger, especially 0.2 μm or larger, and the upper limit thereof is generally 10 μm or smaller, preferably 5 μm or smaller, more preferably 3 μm or smaller, especially 1 μm or smaller. In case where the number-average particle diameter of the inorganic filler exceeds 10 μm, this filler is undesirable because it gives too large pore diameters and this results in impaired penetrability by the electrolyte solution. Furthermore, too large diameters of the pores formed by stretching are apt to lead to elongation breakage and a decrease in film strength. In addition, number-average particle diameters exceeding 10 μm are undesirable because the number of particles present on the separator surface is too small and, hence, the prevention of adhesion between each electrode plate and the separator and the formation of a gap between these are not sufficiently attained. In case where the number-average particle diameter of the filler is smaller than 0.01 μm, this filler is apt to be difficult to evenly disperse in the base resin because it is apt to aggregate. Even if this filler can be evenly dispersed, the pores formed by stretching have too small diameters, which do not considerably differ from the pore diameters obtained in the extraction method (1) and stretching method (2) described above. The separator thus formed is undesirable because it is apt to be clogged and does not have sufficiently high liquid retentivity. In addition, such a filler is undesirable since the prevention of adhesion between each electrode plate and the separator and the formation of a gap between these are not sufficiently attained because of the too small particle diameter thereof.

In the invention, any inorganic filler satisfying the requirements shown above can be used alone, or a mixture of two or more of such inorganic fillers can be used.

The amount of the inorganic filler incorporated in the porous polymer film according to the invention is such that the lower limit thereof is generally 40 parts by weight or larger, preferably 50 parts by weight or larger, especially 60 parts by weight or larger, more preferably 100 parts by weight or larger, per 100 parts by weight of the thermoplastic resin and the upper limit thereof is generally 300 parts by weight or smaller, preferably 200 parts by weight or smaller, more preferably 150 parts by weight or smaller, per 100 parts by weight of the thermoplastic resin.

In case where the amount of the inorganic filler incorporated is smaller than 40 parts by weight per 100 parts by weight of the thermoplastic resin, it is difficult to form interconnected pores and this makes it difficult for the porous film to function as a separator. On the other hand, amounts thereof exceeding 300 parts by weight are undesirable because the resultant resin composition not only has an increased viscosity and poor processability in film formation, but also suffers film breakage during stretching for porosity impartation. In the invention, the filler incorporated during the production of a porous film substantially remains in the porous film formed and, hence, those ranges of the amount of the filler incorporated are the ranges of the filler contained in the porous film.

As the inorganic filler can be used one which has undergone a surface treatment with a surface-treating agent so as to have enhanced dispersibility in the thermoplastic resin. In the case where the thermoplastic resin is a polyolefin resin, examples of this surface treatment include treatments with a fatty acid, e.g., stearic acid, or a metal salt thereof or with a polysiloxane or silane coupling agent.

In forming the porous polymer film according to the invention, a low-molecular compound having compatibility with the thermoplastic resin may be added. This low-molecular compound infiltrates among molecules of the thermoplastic resin to not only reduce intermolecular interaction but also inhibit crystallization and thereby improves the stretchability of the resin composition during sheet forming. Furthermore, the low-molecular compound functions to moderately heighten interfacial adhesion between the thermoplastic resin and the inorganic filler to thereby prevent the formation of too large pores in stretching. The low-molecular compound further functions to prevent the inorganic filler from shedding from the film by heightening interfacial adhesion between the thermoplastic resin and the inorganic filler.

This low-molecular compound preferably is one having a molecular weight of 200-3,000. In case where the molecular weight of the low-molecular compound exceeds 3,000, this low-molecular compound is less apt to infiltrate among molecules of the thermoplastic resin and, hence, the effect of improving stretchability becomes insufficient. On the other hand, molecular weights thereof lower than 200 are undesirable because the so-called blooming in which the low-molecular compound migrates to the surface of the porous polymeric film is apt to occur and this often results in impaired film properties and blocking, although compatibility is improved.

An aliphatic hydrocarbon, a glyceride, or the like is preferably used as the low-molecular compound in the case where the thermoplastic resin is a polyolefin resin. Especially when the polyolefin resin is a polyethylene, it is preferred to use a liquid paraffin or a low-melting wax.

The amount of the low-molecular compound to be incorporated in the resin composition for use as a film-forming material for the porous polymer film according to the invention is such that the lower limit thereof is generally 1 part by weight or larger, preferably 5 parts by weight or larger, per 100 parts by weight of the thermoplastic resin and the upper limit thereof is generally 20 parts by weight or smaller, preferably 15 parts by weight or smaller, per 100 parts by weight of the thermoplastic resin. In case where the amount of the low-molecular compound incorporated is smaller than 1 part by weight per 100 parts by weight of the thermoplastic resin, the effects brought about by the incorporation of the low-molecular compound are not sufficiently obtained. In case where the amount thereof exceeds 20 parts by weight, the compound excessively reduces the intermolecular interaction of the thermoplastic resin, making it difficult to obtain sufficient strength. In addition, such a resin composition during sheet forming smokes or slips in the screw part, making it difficult to conduct stable sheet forming.

Other additives such as, e.g., a heat stabilizer can be further added according to need to the resin composition for use as a film-forming material for the porous polymer film according to the invention. Any known additives may be used without particular limitations. The amount of these additives to be incorporated is generally 0.05-1% by weight based on the whole resin composition.

The porosity of the porous polymer film according to the invention is such that the lower limit of the porosity of the porous polymer film is generally 30% or higher, preferably 40% or higher, more preferably 50% or higher, and the upper limit thereof is generally 80% or lower, preferably 70% or lower, more preferably 65% or lower. Porosities of the film lower than 30% are undesirable because this film has insufficient ion permeability and cannot function as a separator. On the other hand, porosities thereof exceeding 80% are undesirable because this film has reduced actual strength and, hence, breaks during battery fabrication or suffers penetration of an active material to cause short-circuiting.

The porosity of the porous polymer film is the value calculated with the following calculation equation.

$$Pv(\%) = 100 \times (1 - w/[\rho \cdot S \cdot t])$$

S: area of the porous polymer film
t: thickness of the porous polymer film
w: weight of the porous polymer film
ρ: true specific gravity of the porous polymer film Incidentally, the true specific gravity ρ of the porous polymer film can be determined using the following equation, wherein Wi and ρi are the blending weight and specific gravity, respectively, of each of the components i (resin, filler, etc.) constituting the porous polymer film. (In the equation, Σ indicates the sum for all components.)

$$\text{True specific gravity } \rho = \Sigma Wi / \Sigma (Wi/\rho i)$$

The upper limit of the thickness of the porous polymer film according to the invention is generally 100 μm or smaller, preferably 40 μm or smaller, and the lower limit thereof is generally 5 μm or larger, preferably 10 μm or larger. Thicknesses of the film smaller than 5 μm are undesirable because this film has reduced actual strength and, hence, breaks during battery fabrication or suffers penetration of an active material to cause short-circuiting. On the other hand, thicknesses thereof exceeding 100 μm are undesirable because this separator has heightened electrical resistance and this results in a reduced battery capacity. Furthermore, thicknesses thereof exceeding 100 μm are undesirable also because the amount of the active materials which can be charged into a battery is reduced and the capacity of the whole battery is hence reduced. By regulating the thickness of the separator so as to be in range of 5-100 μm, this separator can be made to have satisfactory ion permeability.

The lower limit of the average pore diameter of the porous polymer film according to the invention is 0.05 μm or larger, preferably 0.1 μm or larger, more preferably 0.2 μm or larger. The upper limit thereof is 10 μm or smaller, preferably 5 μm or smaller, more preferably 3 μm or smaller, especially preferably 1 μm or smaller. Average pore diameters thereof smaller than 0.05 μm are undesirable because it is difficult to sufficiently secure pore interconnection in the porous film. Average pore diameters thereof larger than 10 μm are undesirable because it is difficult to secure a practical film strength. The pore diameter of the porous polymer film can be changed at will by suitably selecting properties (particle diameter, etc.) of the inorganic filler or an amount of the filler as will be described later. Incidentally, the average pore diameter of the porous polymer film is herein determined by the method as provided for in ASTM F316-86.

Furthermore, the lower limit of the Gurley air permeability of the porous polymer film according to the invention preferably is 20 sec/100 cc or higher, especially 100 sec/100 cc or higher, and the upper limit thereof preferably is 700 sec/100 cc or lower, especially 300 sec/100 cc or lower. In case where the Gurley air permeability thereof is lower than the lower limit, this film frequently has too high a pore content or too small a thickness. Such low Gurley air permeabilities are hence undesirable because the film has reduced actual strength and suffers breakage during battery fabrication or penetration of an active material to cause short-circuiting, as stated above. Gurley air permeabilities exceeding the upper limit are undesirable because this film has insufficient ion permeability and cannot function as a separator. Incidentally, Gurley air permeability is measured in accordance with JIS P8117 and indicates the number of seconds required for 100 cc of air to pass through the film at a pressure of 1.22 kPa.

In addition, the porous polymer film according to the invention has an average rate of change in retained-liquid amount as determined in the following manner of generally 15 %/min or lower, preferably 12%/min or lower, more preferably 10%/min or lower. In case where the average rate of change in retained-liquid amount exceeds 15%/min, sufficient liquid retentivity is not obtained. It is hence impossible to sufficiently obtain the cycle characteristics-improving effect attained by alleviating the state of being deficient in the electrolyte solution in the battery element by using the specific separator. The lower the average rate of change in retained-liquid amount, the higher the liquid retentivity and the more the separator is preferred. However, a lower limit thereof of about 5%/min suffices.

<Average Rate of Change in Retained-Liquid Amount of Separator>

A separator which has been cut into a size of 4 cm×4 cm is weighed. Subsequently, the separator is immersed in an electrolyte solution to allow the electrolyte solution to sufficiently infiltrate into the separator. The separator is then pulled up and the electrolyte solution adherent to the surface thereof is wiped off. This separator is weighed. The difference in weight between this separator and the separator before the immersion is taken as the weight of the electrolyte solution which has infiltrated. This separator is further examined for weight change at an interval of 30 seconds over 2 minutes. The average rate of change in retained-liquid amount is calculated by the method shown in the following table.

TABLE 2

| | Weight | Rate of change in retained-liquid amount (%/min) |
|---|---|---|
| Weight before immersion | W0 | |
| Weight just after immersion (0 min) | W1 | |
| Weight after 0.5 min | W2 | (W1 − W2)/(W1 − W0) × 100/0.5 (1) |
| Weight after 1.0 min | W3 | (W2 − W3)/(W2 − W0) × 100/0.5 (2) |
| Weight after 1.5 min | W4 | (W3 − W4)/(W3 − W0) × 100/0.5 (3) |
| Weight after 2.0 min | W5 | (W4 − W5)/(W4 − W0) × 100/0.5 (4) |
| Average rate of change in retained-liquid amount | | average of (1) to (4) |

<Process for Producing the Separator>

Separators for use in lithium secondary batteries are required to satisfy requirements such as not to inhibit ion conduction between the two electrodes, to be capable of retaining the electrolyte solution, and to have resistance to the electrolyte solution. Porous polymer films made of a thermoplastic resin such as polyethylene or polypropylene have mainly been used hitherto. The processes for producing these porous polymer films include (1) the extraction method, (2) the stretching method, and (3) the interfacial separation method as stated above.

However, in the extraction method (1), since it is necessary to select a plasticizer having good compatibility with the polymeric material, sufficiently large pores cannot be formed through extraction or through extraction and subsequent stretching. Because of this, the separator obtained does not have sufficient liquid retentivity. Although a technique in which a poorly compatible plasticizer is added to form large pores is known, molding in this method is unstable and a film having satisfactory properties is difficult to obtain. Whichever method is used, it is necessary to treat a large amount of a waste liquid in the extraction step. These methods hence have problems also from the standpoint of both environment and profitability. In addition, since film shrinkage occurs in the extraction step and this makes it difficult to obtain an even film, the extraction method further has a problem concerning productivity such as yield. In the stretching method (2), high-ratio stretching is difficult because only the amorphous parts present among crystal domains are selectively stretched. Because of this, the stretching method has a drawback that it is difficult to obtain a large pore diameter and the separator obtained has reduced liquid retentivity. Furthermore, the stretching method necessitates a long-term heat treatment because a pore diameter distribution is regulated by regulating the crystalline phase/amorphous phase structure before stretching. The stretching method hence has a problem concerning productivity.

In contrast, in the interfacial separation method (3), separation at the interface between the polymeric material and the filler can be easily caused by a stretching operation. Consequently, the interfacial separation method can easily produce a porous film having a large pore diameter without necessitating a pretreatment such as a heat treatment, as compared with the methods (1) and (2). Such a separator having a large pore diameter satisfactorily retains electrolyte solutions as stated above and is less apt to become deficient in the electrolyte solution in the battery element. This separator is hence effective in preventing cycle characteristics from decreasing. Furthermore, the interfacial separation method is free from waste liquid generation or the like and is an excellent process from the standpoint of both environment and profitability.

Besides the methods (1) to (3) described above, a method comprising mixing a polymeric material with a plasticizer and an inorganic filler in an organic solvent to prepare a paste, forming the paste into a film by casting or another technique, and then extracting or vaporizing the plasticizer is known as a method for forming a porous polymer film containing an inorganic filler. However, this method necessitates an additional step for plasticizer removal like the method (1) described above, and is inferior in simplicity to the interfacial separation method.

Consequently, the separator of the invention is produced preferably by the interfacial separation method. More specifically, the separator is produced by the following method.

First, an inorganic filler, a thermoplastic resin, and additives optionally added, such as, e.g., a low-molecular compound and an antioxidant, are mixed together in given amounts. The resultant mixture is melted/kneaded to thereby prepare a resin composition. This resin composition may be prepared through premixing with a Henschel mixer or the like and subsequent kneading with an ordinary apparatus such as a single-screw extruder, twin-screw extruder, mixing rolls, or twin-screw kneader. Alternatively, the premixing may be omitted to directly prepare the resin composition with any of these extruders or the like.

Subsequently, the resin composition is formed into a sheet. Sheet forming can be conducted by the T-die method using an ordinary T-die or the inflation method using a circular die.

Next, the sheet formed is stretched. Examples of the stretching include machine-direction uniaxial stretching in which the sheet is stretched in the sheet haul direction (MD), transverse-direction uniaxial stretching in which the sheet is stretched in the transverse direction (TD) with a tenter or the like, successive biaxial stretching in which the sheet is uniaxially stretched in the MD and successively stretched in the TD with a tenter or the like, and simultaneous biaxial stretching in which the sheet is stretched in the machine direction and transverse direction simultaneously. The uniaxial stretching can be conducted by roll stretching. The stretching can be conducted at any desired temperature which enables the resin composition constituting the sheet to be easily stretched to a given stretch ratio and which prevents the resin composition from melting and thereby closing the pores to eliminate pore interconnection. Preferably, however, the stretching is conducted at a temperature in the range of from [(melting point of the resin)−70° C.] to [(melting point of the resin)−5° C.]. A stretch ratio is selected at will according to the pore diameter and strength required. Preferably, however, the sheet is stretched at least uniaxially in a ratio of 1.2 or higher. Although the upper limit of the stretch ratio is not particularly limited, the stretch ratio in each direction is usually up to 7. In case where the sheet is stretched in a stretch ratio exceeding this upper limit, the porous film obtained may have too high a porosity and hence reduced strength. There is a possibility that this film cannot withstand practical use.

[Nonaqueous Electrolyte Solution]

The nonaqueous electrolyte solution for use in the nonaqueous-electrolyte secondary battery of the invention comprises a nonaqueous solvent and a lithium salt.

<Nonaqueous Solvent>

As the nonaqueous solvent of the electrolyte solution for use in the nonaqueous-electrolyte secondary battery of the invention, use can be made of any desired nonaqueous solvent known as a solvent for nonaqueous-electrolyte secondary batteries. Examples thereof include cyclic carbonates such as alkylene carbonates, e.g., ethylene carbonate, propylene carbonate, and butylene carbonate (preferably, alkylene carbonates having 3-5 carbon atoms); chain carbonates such as dialkyl carbonates, e.g., dimethyl carbonate, diethyl carbonate, di-n-propyl carbonate, and ethyl methyl carbonate (preferably, dialkyl carbonates having an alkyl group having 1-4 carbon atoms); cyclic ethers such as tetrahydrofuran and 2-methyltetrahyrdofuran; chain ethers such as dimethoxyethane and dimethoxymethane; cyclic carboxylic acid esters such as γ-butyrolactone and γ-valerolactone; and chain carboxylic acid esters such as methyl acetate, methyl propionate, and ethyl propionate. These may be used alone or in combination of two or more thereof.

Of the solvents shown above as examples, a mixed nonaqueous solvent prepared by mixing at least one cyclic carbonate with at least one chain carbonate is preferred from the standpoint of heightening the whole battery performances, e.g., charge/discharge characteristics and battery life. The mixed nonaqueous solvent preferably is one prepared by mixing the carbonates so that the content of the cyclic carbonate and that of the chain carbonate in the whole nonaqueous solvent each are 15% by volume or higher and the total volume of these accounts for at least 70% by volume of the whole nonaqueous solvent.

The cyclic carbonate for use in the mixed nonaqueous solvent comprising a mixture of a cyclic carbonate and a chain carbonate preferably is an alkylene carbonate in which the alkylene group has 2-4 carbon atoms. Specific examples thereof include ethylene carbonate, propylene carbonate, and butylene carbonate. Preferred of these are ethylene carbonate and propylene carbonate.

The chain carbonate for use in the mixed nonaqueous solvent comprising a mixture of a cyclic carbonate and a chain carbonate preferably is a dialkyl carbonate having an alkyl group having 1-4 carbon atoms. Specific examples thereof include dimethyl carbonate, diethyl carbonate, di-n-propyl carbonate, ethyl methyl carbonate, methyl n-propyl carbonate, and ethyl n-propyl carbonate. Preferred of these are dimethyl carbonate, diethyl carbonate, and ethyl methyl carbonate.

Those cyclic carbonates and chain carbonates each independently may be used alone. Alternatively, any desired combination of two or more of the cyclic or chain carbonates may be used in any desired proportion. In the mixed nonaqueous solvent, the content of the cyclic carbonate is preferably 15% by volume or higher, especially 20-50% by volume, and the content of the chain carbonate is preferably 30% by volume or higher, especially 40-80% by volume. The proportion of the cyclic carbonate to the chain carbonate in the mixed solvent preferably is such that (cyclic carbonate):(chain carbonate)=1:(1-4) (by volume).

The mixed nonaqueous solvent may further contain solvents other than cyclic carbonates and chain carbonates as long as the presence thereof does not reduce the battery performances of the lithium battery to be produced. The proportion of solvents other than cyclic carbonates and chain carbonates in the mixed nonaqueous solvent is generally 30% by volume or lower, preferably 10% by volume or lower.

It is also preferred that the nonaqueous electrolyte solution to be used in the nonaqueous-electrolyte secondary battery of the invention should comprise a nonaqueous solvent and a lithium salt and contain at least one chain carbonate represented by ROCOOCH$_3$ (R is methyl or ethyl), i.e., dimethyl carbonate (DMC) and/or ethyl methyl carbonate (EMC).

In this case, the nonaqueous electrolyte solution according to the invention may contain, besides the specific chain carbonate shown above, any desired solvent known as a solvent for nonaqueous-electrolyte secondary batteries. Preferably, the specific chain carbonate is used in combination with other solvent(s).

Examples of the additionally usable nonaqueous solvents include cyclic carbonates such as alkylene carbonates, e.g., ethylene carbonate, propylene carbonate, and butylene carbonate (preferably, alkylene carbonates having 3-5 carbon atoms); chain carbonates such as dialkyl carbonates, e.g., diethyl carbonate and di-n-propyl carbonate (preferably, dialkyl carbonates having 5 or more carbon atoms and having an alkyl group with up to 4 carbon atoms); cyclic ethers such as tetrahydrofuran and 2-methyltetrahyrdofuran; chain ethers such as dimethoxyethane and dimethoxymethane; cyclic carboxylic acid esters such as γ-butyrolactone and γ-valerolactone; and chain carboxylic acid esters such as methyl acetate, methyl propionate, and ethyl propionate. Only one of these additionally usable nonaqueous solvents may be used in combination with the specific chain carbonate, or two or more of these may be used in combination with it.

The content of the specific chain carbonate, i.e., DMC and/or EMC, in the nonaqueous electrolyte solution is preferably 5% by volume or higher, more preferably 10% by volume or higher, most preferably 30% by volume or higher. The content thereof is preferably 95% by volume or lower, more preferably 90% by volume or lower, most preferably 85% or lower. Furthermore, the content of the specific chain carbonate, i.e., DMC and/or EMC, in the nonaqueous electrolyte solution is preferably 4% by weight or higher, more preferably 10% by weight or higher, most preferably 20% by weight or higher. The content thereof is preferably 85% by weight or lower, more preferably 80% by weight or lower, most preferably 75% by weight or lower. In case where the content thereof is outside that range, there is a possibility that sufficient cycle characteristics might be difficult to obtain. There also is a possibility that the conductivity of the electrolyte solution might decrease.

Incidentally, in the case where DMC and EMC are used in combination, the DMC/EMC mixing ratio is not particularly limited and any desired proportion may be employed.

A mixed nonaqueous solvent prepared by mixing DMC and/or EMC with at least one cyclic carbonate, among the solvents shown above as examples usable with DMC and/or EMC, is especially preferred from the standpoint of heightening the whole battery performances, e.g., charge/discharge characteristics and battery life. In this case, the content of the cyclic carbonate is preferably 5% by volume or higher, more preferably 10% by volume or higher, most preferably 15% by volume or higher, based on the whole nonaqueous solvent. The content thereof is preferably 70% by volume or lower, more preferably 60% by volume or lower, most preferably 50% by volume or lower. In case where the content thereof is lower than the lower limit, there is a possibility that high-temperature storability might decrease. In case where the content thereof exceeds the upper limit, there is a possibility that high-rate charge/discharge characteristics might decrease. The proportion of the cyclic carbonate to the DMC and/or EMC preferably is such that (cyclic carbonate):(DMC and/or EMC)=1:(1-4) (by volume).

The cyclic carbonate usable in combination with DMC and/or EMC preferably is an alkylene carbonate in which the alkylene group has 2-4 carbon atoms. Specific examples thereof include one or two of ethylene carbonate, propylene carbonate, butylene carbonate, and the like. Preferred of these are ethylene carbonate and/or propylene carbonate. It is especially preferred to use at least ethylene carbonate.

In the case where DMC and/or EMC is used in combination with at least one other chain carbonate, this chain carbonate preferably is a dialkyl carbonate having 5 or more carbon atoms and having an alkyl group with up to 4 carbon atoms. Specific examples thereof include one of or two or more of diethyl carbonate, di-n-propyl carbonate, methyl n-propyl carbonate, ethyl n-propyl carbonate, and the like. Preferred of these is diethyl carbonate. In the case where DMC and/or EMC is used in combination with at least one chain carbonate other than these, the content of this chain carbonate is preferably 40% by volume or lower, more preferably 30% by volume or lower, most preferably 25% by volume or lower, based on the whole nonaqueous solvent. In case where the content thereof exceeds the upper limit, there is a possibility that cycle characteristics might decrease.

It is a matter of course that a mixture of DMC and/or EMC with a chain carbonate other than DMC and/or EMC and with a cyclic carbonate may be used in the invention as long as the contents of these are within the respective ranges shown above. Furthermore, the nonaqueous electrolyte solution according to the invention may contain a solvent which is neither a cyclic carbonate nor a chain carbonate, as long as the presence of this solvent does not reduce the battery performances of the lithium battery to be produced. The proportion of the solvent which is neither a cyclic carbonate nor a chain carbonate, in the mixed nonaqueous solvent, is generally 30% by volume or lower, preferably 10% by volume or lower.

<Lithium Salt>

The lithium salt to be used as a solute in the nonaqueous electrolyte solution can be any desired lithium salt. Examples thereof include inorganic lithium salts such as $LiClO_4$, $LiPF_6$, and $LiBF_4$ and fluorine-containing organolithium salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, and $LiBF_2(C_2F_5SO_2)_2$. Preferred of these are fluorine-containing lithium salts such as $LiPF_6$, $LiBF_4$, $LiCF_3SO_3$, $LiN(CF_3SO_2)_2$, and $LiN(C_2F_5SO_2)_2$. Especially preferred are $LiPF_6$ and $LiBF_4$. Such lithium salts also may be used alone or in combination of two or more thereof.

The lower limit of the concentration of these lithium salts in the nonaqueous electrolyte solution is generally 0.5 mol/L or higher, especially 0.75 mol/L or higher, and the upper limit thereof is generally 2 mol/L or lower, especially 1.5 mol/L or lower. In case where the lithium salt concentration exceeds the upper limit, the nonaqueous electrolyte solution has an increased viscosity and a reduced electrical conductivity. In case where the concentration thereof is lower than the lower limit, the result is a reduced electrical conductivity. It is therefore preferred to prepare a nonaqueous electrolyte solution having a concentration within that range.

<Film-Forming Agent>

The nonaqueous electrolyte solution of the invention preferably contains a film-forming agent. The film-forming agent for use in the invention preferably is one which forms, on the surface of the negative electrode, a resistant film whose resistance has a moderately large temperature dependence. This film-forming agent is preferred from the standpoint of effectively obtaining the effect of preventing rate characteristics from decreasing especially in a low-temperature environment when the film-forming agent is used in combination with the specific separator described above for use in the invention.

In view of such requirement, examples of the film-forming agent to be used in the invention include carbonate compounds having an ethylenically unsaturated bond, such as vinylene carbonate, vinylethylene carbonate, fluoroethylene carbonate, trifluoropropylene carbonate, phenylethylene carbonate, and erythritan carbonate, and carboxylic acid anhydrides such as succinic anhydride, glutaric anhydride, maleic anhydride, citraconic anhydride, glutaconic anhydride, itaconic anhydride, diglycolic anhydride, cyclohexanedicarboxylic acid anhydride, cyclopentanetetracarboxylic acid dianhydride, and phenylsuccinic anhydride. Especially from the standpoints of the satisfactory effect of improving cycle characteristics and the temperature dependence of film resistance, preferred film-forming agents are vinylene carbonate, vinylethylene carbonate, and succinic anhydride. It is more preferred to use vinylene carbonate because it can form a film of especially good quality. Those film-forming agents may be used alone or as a mixture of two or more thereof.

In the invention, the content of the film-forming agent in the nonaqueous electrolyte solution is 0.01% by weight or higher, preferably 0.1% by weight or higher, more preferably 0.3% by weight or higher, and is 10% by weight or lower, preferably 8% by weight or lower, more preferably 7% by weight or lower. In case where the content of the film-forming agent is lower than the lower limit of that range, the effect of improving the cycle characteristics of the battery is difficult to obtain. On the other hand, contents thereof exceeding the upper limit may lead to a decrease in low-temperature rate characteristics.

<Aromatic Compound Having Exothermic Property of 1.5 or Higher>

The nonaqueous electrolyte solution of the invention preferably contains an aromatic compound having an exothermic property of 1.5 or higher. In the invention, the exothermic property of an aromatic compound is defined as the property determined by the following method.

<Method of Determining Exothermic Property>

A test battery is fabricated and an exothermic test is conducted by the following procedures to thereby determine the exothermic property.

(i) Fabrication of Test Battery

Preparation of Nonaqueous Electrolyte solution

Ethylene carbonate is mixed with ethyl methyl carbonate in a ratio of 3:7 (by volume). $LiPF_6$ is mixed therewith as a lithium salt in such an amount as to result in a concentration of 1 mol/L. Thereto is added an aromatic compound as a sample in such an amount as to result in a concentration of 3% by weight based on the electrolyte solution. The ingredients are mixed to prepare a nonaqueous electrolyte solution.

Production of Positive Electrode $LiCoO_2$ is used as a positive-electrode active material. To 90 parts by weight of $LiCoO_2$ are added 5 parts by weight of carbon black and 5 parts by weight of poly(vinylidene fluoride) (trade name "KF-1000" manufactured by Kureha Chemical Co., Ltd.). The ingredients are mixed together and dispersed with N-methyl-2-pyrrolidone to obtain a slurry. This slurry is evenly applied to each side of a 20 μm-thick aluminum foil as a positive-electrode current collector and dried. Thereafter, the coated foil is pressed with a pressing machine so as to result in positive-electrode active-material layers having a density of 3.0 g/cm$^3$. Thus, a positive electrode is obtained.

Production of Negative Electrode

A powder of natural graphite is used as a negative-electrode active material. With 94 parts by weight of the powder of natural graphite is mixed 6 parts by weight of poly(vinylidene fluoride). This mixture is dispersed with N-methyl-2-pyrrolidone to obtain a slurry. This slurry is applied to one side of an 18 μm-thick copper foil as a negative-electrode current collector and dried. Thereafter, the coated foil is pressed with a pressing machine so as to result in a negative-electrode active-material layer having a density of 1.5 g/cm$^3$. Thus, a negative electrode is obtained.

Separator

Use is made of one which is made of a polyethylene (having a weight-average molecular weight in the range of 300,000-1,000,000) and satisfies property requirements that the thickness and porosity are in the ranges of 15-25 μm and 30-50%, respectively.

Fabrication of Test Battery

The positive electrode, negative electrode, and separator are superposed in the order of negative electrode/separator/positive electrode/separator/negative electrode. The battery element thus obtained is first sandwiched between PET films and then inserted between laminate films comprising an aluminum layer coated on each side with a resin layer, in such a manner that the terminals of the positive electrode and negative electrode remain protrudent. Thereto is added 0.5 cc of the electrolyte solution. The resultant structure is vacuum-sealed to produce a sheet-form lithium secondary battery (laminate battery). Furthermore, the sheet-form battery is sandwiched between a silicone rubber and a glass plate and this assemblage is pressed at 0.35 kg/cm² in order to enhance tight contact with the electrodes.

(ii) Exothermic Test

Pretreatment

At 25° C., the test battery is subjected to 5 cycles of charge/discharge in which the battery is charged and discharged to a final charge voltage of 4.2 V and a final discharge voltage of 3 V, respectively, at a current corresponding to 0.2 C (the current value at which the rated capacity which is the 1-hour-rate discharge capacity is discharged over 1 hour is referred to as 1 C; the same applies hereinafter) to stabilize the battery. In the fourth cycle, the battery is fully charged by 4.2-V constant-current constant-voltage charge (CCCV charge) (0.05 C cut) in which the battery is charged to a final charge voltage of 4.2 V at a current corresponding to 0.5 C and charged until the charge current reaches the current value corresponding to 0.05 C.

The battery which has been fully charged is allowed to stand for 1 hour after the charge, and then the temperature ($T_i$) of the central part of an aluminum surface outside the laminate battery is measured.

Conditions for Determination of Exothermic Property

The battery which has been fully charged is further charge (overcharged) at a current value corresponding to 2 C. At 21 minutes after initiation of the charge, i.e., at the time when the battery has reached a 170% overcharged state provided that the fully charged state is 100%, the temperature ($T_f$) of the central part of the aluminum surface outside the laminate battery is measured.

When the found values of such temperatures obtained with the nonaqueous electrolyte solution containing no aromatic compound are respectively indicated by $T°_i$ and $T°_f$, the value determined with the calculation formula $$(T_f-T_i)-(T°_f-T°_i)$$

is defined as the exothermic property in the invention.

Incidentally, the unit of all of those temperatures is Celsius temperature (° C.).

In the invention, an aromatic compound having a value of this exothermic property of 1.5 or higher is used. The exothermic property thereof is generally 1.5 or higher, preferably 1.8 or higher, more preferably 2.0 or higher, and is generally 6.0 or lower, preferably 5.5 or lower, more preferably 5.2 or lower. In case where the exothermic property thereof exceeds the upper limit, the battery is apt to heat up to a high temperature, which is dangerous. In case where the exothermic property thereof is lower than the lower limit, the battery safety which is an object of the invention is difficult to obtain.

Furthermore, the molecular weight of this aromatic compound is generally 80 or higher, preferably 100 or higher, more preferably 120 or higher, and is generally 300 or lower, preferably 250 or lower, more preferably 230 or lower. In case where the molecule weight thereof exceeds the upper limit, this aromatic compound is less apt to dissolve in nonaqueous solvents. In case where the molecular weight thereof is lower than the lower limit, the effect of preventing overcharge is difficult to obtain.

Examples of the compound having an exothermic property of 1.5 or higher include aromatic compounds such as cyclohexylbenzene, cyclohexylfluorobenzene, biphenyl, fluorobiphenyl, and diphenyl ether. These aromatic compounds may be used alone or as a mixture of two or more thereof.

The content of such an aromatic compound having an exothermic property of 1.5. or higher in the nonaqueous electrolyte solution is generally 0.1% by weight or higher, preferably 0.3% by weight or higher, more preferably 0.5% by weight or higher, and is generally 8% by weight or lower, preferably 6% by weight or lower, more preferably 5% by weight or lower. In case where the content of the aromatic compound exceeds the upper limit, there is a possibility that storability and cycle characteristics might deteriorate. In case where the content thereof is lower than the lower limit, the effect of preventing overcharge is difficult to obtain.

<Other Additives>

Besides the nonaqueous solvent and lithium salt, other useful ingredients may be optionally incorporated into the nonaqueous electrolyte solution according to the invention. For example, known various additives may be incorporated, such as film-forming agents for the negative electrode, e.g., vinylene carbonate, fluoroethylene carbonate, vinylethylene carbonate, phenylethylene carbonate, and succinic anhydride, protective agents for the positive electrode, e.g., ethylene sulfite, propylene sulfite, dimethyl sulfite, propanesultone, butanesultone, methyl methanesulfonate, methyl toluenesulfonate, dimethyl sulfate, ethylene sulfate, sulfolane, dimethyl sulfoner diethyl sulfone, dimethyl sulfoxide, diethyl sulfoxide, tetramethylene sulfoxide, diphenyl sulfide, thioanisole, diphenyl disulfide, and dipyridinium disulfide, deoxidizers, dehydrants, and overcharge inhibitors.

[Active Materials]

With respect to the active materials, the invention satisfies at least either of the following: the active material contained in the negative electrode is a particulate active material having an aspect ratio of from 1.02 to 3; and the active material contained in the positive electrode is a particulate active material having an aspect ratio of from 1.02 to 2.2.

This aspect ratio is defined as the following.

<Definition of Aspect Ratio>

A particulate active material is dispersed on a flat plate and is embedded as it is with a resin. This resin containing the active material embedded therein is polished parallel to the flat plate, and a photograph of a section thereof is taken with a scanning electron microscope (SEM). With respect to an electrode produced with a particulate active material, a section of the electrode is polished parallel to the current collector (metal foil, etc.), and a photograph of a section of electrode particles present in this electrode section is taken with a scanning electron microscope (SEM). The SEM photograph taken is subjected to image analysis to thereby measure the major-axis length and minor-axis length of a particle section with respect to 20 points. The aspect ratio is determined from the averages thereof (this aspect ratio is hereinafter referred to as "two-dimensional aspect ratio").

Besides the aspect ratio described above, the following aspect ratio may be used. A particulate active material is dispersed on a flat plate and is embedded as it is with a resin. This resin containing the active material embedded therein is polished parallel to the flat plate, and both a photograph of a horizontal section thereof and a photograph of a vertical section thereof are taken. With respect to an electrode produced with a particulate active material, a section of the electrode is polished parallel to the current collector (metal foil, etc.), and a photograph of a section of electrode particles present in this electrode section (section parallel to the current collector) is taken. Furthermore, the electrode is cut along a plane perpendicular to that section, a resultant cut surface is polished, and a photograph of a section of electrode particles present in this vertical electrode section (section perpendicular to the current collector) is taken. The SEM photographs taken are subjected to image analysis to thereby measure the major-axis length and minor-axis length of each of a horizontal particle section and a vertical particle section with respect to 20 or more points. The aspect ratio is determined from the averages thereof (this aspect ratio is hereinafter referred to as "three-dimensional aspect ratio"). Thus, the shape of the particulate active material is grasped in a more three-dimensional manner.

In the invention, a particulate active material in which the two-dimensional aspect ratio, preferably three-dimensional aspect ratio, is from 1.02 to 2.2 is used as the positive-electrode active material.

Furthermore, a particulate active material in which the two-dimensional aspect ratio, preferably three-dimensional aspect ratio, is from 1.02 to 3 is used as the negative-electrode active material.

<Aspect Ratios of Active Materials>

In the invention, the upper limit of the two-dimensional aspect ratio of the positive-electrode active material is generally 2.2 or lower, in particular 1.6 or lower, especially 1.2 or lower, and the lower limit thereof is generally 1.02 or higher, in particular 1.05 or higher, especially 1.1 or higher. The upper limit of the three-dimensional aspect ratio of the active material is generally 2.2 or lower, in particular 1.5 or lower, especially 1.2 or lower, and the lower limit thereof is generally 1.02 or higher, in particular 1.05 or higher, especially 1.1 or higher.

In case where the aspect ratio of the positive-electrode active material exceeds the upper limit, the tap density thereof is not so high because of the flat particle shape. Consequently, the accumulation of side-reaction products which accompanies high-density packing is less apt to occur and, hence, the cycle characteristics-improved effect of the invention is not so high. In case where the aspect ratio of the positive-electrode active material is lower than the lower limit, this active material is difficult to industrially produce in a high yield because the sphericity thereof is extremely high.

On the other hand, the upper limit of the two-dimensional aspect ratio of the negative-electrode active material is generally 3.0 or lower, in particular 2.4 or lower, especially 1.7 or lower, particularly 1.4 or lower, and the lower limit thereof is generally 1.02 or higher, in particular 1.05 or higher, especially 1.1 or higher. The upper limit of the three-dimensional aspect ratio of the active material is generally 3 or lower, in particular 2.5 or lower, especially 1.9 or lower, particularly 1.4 or lower, and the lower limit thereof is generally 1.02 or higher, in particular 1.05 or higher, especially 1.1 or higher.

In case where the aspect ratio of the negative-electrode active material exceeds the upper limit, the tap density thereof is not so high because of the flat particle shape. Consequently, the accumulation of side-reaction products which accompanies high-density packing is less apt to occur and, hence, the cycle characteristics-improved effect of the invention is not so high. In case where the aspect ratio of the negative-electrode active material is lower than the lower limit, this active material is difficult to industrially produce in a high yield because the sphericity thereof is extremely high.

<Aspect Ratio Regulation of Active Materials>

Methods for obtaining negative-electrode active-material particles having a given aspect ratio and a given shape are not particularly limited. However, in the case of a negative-electrode active material made of a carbon material, examples of production methods include the following.

As a carbon material, use may be made of either a carbon material occurring naturally or a carbon material produced artificially. Methods for producing a carbon material for the negative electrode also are not particularly limited. Consequently, it is also possible to obtain a negative-electrode carbon material having the aspect ratio through screening by a fractionating technique such as, for example, sieving or air classification. Alternatively, a carbon material for the negative electrode can be obtained by a method in which a carbon or graphite material occurring naturally or a carbonized or graphitized material produced artificially is sphered by subjecting it to a treatment with mechanical energy, e.g., for promoting surface pulverization or the like. One example of the mechanical-energy treatment is the well-known technique in which a carbonaceous material is subjected to surface pulverization to thereby obtain the desired carbon material. For example, a pulverizer having a high-speed rotor whose casing is equipped with many blades inside may be used to conduct the surface treatment of a carbonaceous material while pulverizing it by means of a mechanical action such as impact compression, friction, or shearing. The peripheral speed of the rotor is preferably 30-100 m/sec, especially 50-100 m/sec. For classification after the pulverization, use is generally made of an air flow type classifier such as a forced vortex type centrifugal separator, e.g., Micron Separator or Turbopelx, or an inertial classifier such as Elbow Jet. However, the wet precipitation separation method or a centrifugal precipitator or the like may be used.

Furthermore, the target active material may be obtained by mixing a naturally occurring carbon or graphite material or an artificially produced carbonized or graphitized material with a carbon precursor, heating the resultant mixture to regulate the degree of crystallization and thereby obtain a desired carbonized or graphitized material, and subjecting this material to a powder processing treatment. In this case, use may be made of a technique in which the carbon powder or graphite powder to be mixed with a carbon precursor or the mixture of these is sphered beforehand by a mechanical-energy treatment so as to enable the final powder processing treatment to yield particles having a given shape. Use may also be made of a method in which the selection of a carbon material is improved, e.g., a non-acicular coke, which is poorly graphitizable, is selected, so as to make it easy to obtain a desired shape in the pulverization step after the carbonization or graphitization. It is also possible to obtain a desired shape by finally yielding active-material particles each comprising many fine particle bonded to one another through a carbonized or graphitized material derived from the carbon precursor. Moreover, use may be made of a material obtained by carbonizing or graphitizing the so-called meso-carbon microbeads obtained by treating a carbon precursor with a solvent to dissolve undeveloped structures in the solvent and thereby take out developed spherulites. For obtaining negative-electrode active-material particles having a given shape, these methods can be used alone or a combination of two more thereof can be used.

The negative-electrode active material to be used may be one of particulate active materials obtained by those and other methods or may be a mixture of two or more of these.

On the other hand, the positive-electrode active material to be used preferably is a composite oxide of lithium and one or more transition metals (hereinafter referred to as "lithium/transition metal composite oxide"), which is represented by lithium cobalt oxide, lithium nickel oxide, spinel type lithium manganate, and ones containing two or more of these transition metals, such as lithium nickel cobalt oxide and lithium nickel manganate.

Examples of methods for obtaining particles of such a positive-electrode active material which have a given aspect ratio include the methods described below.

For synthesizing a positive-electrode active material, the spray drying method or a kind of coprecipitation method such as the hydroxide method or composite carbonate method is used to conduct mixing of different elements and regulation of a particle shape. The resultant particles are burned by a given method, whereby positive-electrode active-material particles which have been made spherical or ellipsoidal can be obtained. Namely, the method in extensive use is to mix a lithium compound ($Li_2CO_3$, etc.) powder with a transition metal compound ($MnO_2$, $CO_2O_4$, NiO, etc.) powder and burn the mixture to obtain a lithium/transition metal composite oxide. Examples thereof include a method which comprises mixing a transition metal compound which becomes an oxide upon burning (e.g., a compound of cobalt, nickel, or manganese; more specifically, $Co_3O_4$, CoO, $Co(OH)_2$, NiO, $MnO_2$, $Mn_3O_4$, $Mn_2O_3$, $MnCO_3$, etc.) and a lithium compound which becomes an oxide upon burning (e.g., $LiCO_3$, LiOH, or LiCl) with each other as raw materials in a given proportion, adding a dispersion medium (e.g., water) to these powders, wet-mixing these ingredients to prepare a slurry, and spray-drying the slurry with a spray dryer. An oxide of Cr, Al, Co, Ni, Mo, W, or the like as a dopant element may be added to the raw materials according to need. It is preferred to add a solution of a polymer such as PVA to the slurry. The spray drying is a method in which an atomizer is used and the slurry which has been atomized is fed to the drying chamber and dried to obtain spherical particles, Examples of methods for the atomization include the disk method, pressure nozzle method, two-fluid nozzle method, and four-fluid nozzle method. The fine particles obtained by the spray drying become a lithium/transition metal composite oxide through a burning step.

The maximum temperature in the burning is generally 500° C. or higher, preferably 600° C. or higher, more preferably 800° C. or higher. Too low temperatures necessitate too long a treatment period for obtaining given crystallinity, while too high temperatures result in the formation of a crystal phase other than the target lithium/transition metal composite oxide or in the formation of a lithium/transition metal composite oxide having many defects. Because of this, the temperature is generally 1,100° C. or lower, preferably 1,050° C. or lower, more preferably 950° C. or lower. Although this burning can be conducted in one constant atmosphere wholly at a time, a burning treatment may be conducted in at least two steps. The gas atmosphere to be used for the burning can be the air or an oxygen atmosphere. However, it is preferred to conduct the burning in at least two steps comprising a first step conducted in a low-oxygen-concentration atmosphere and a second step conducted in a high-oxygen-concentration atmosphere. The low-oxygen-concentration atmosphere has an oxygen content of from 10% by volume to 0% by volume, while the oxygen content in the high-oxygen-concentration atmosphere is 80% by volume or lower, preferably 50% by volume or lower, and is 15% by volume or higher, preferably 20% by volume or higher. The timing of changeover from the low-oxygen-concentration atmosphere to the high-oxygen-concentration atmosphere preferably is anywhere between the initiation of burning to heating to the maximum temperature. The changeover temperature is set generally at 900° C. or lower, preferably at 800° C. or lower. In the case where the particle diameter size of the particles is regulated after the burning, the particles are disaggregated with, e.g., a mortar mill and then classified with a sieve or the like to obtain a given particle diameter size.

By those methods such as coprecipitation and spray drying, a particulate active material having a relatively low aspect ratio can be produced through particle formation. However, the powder obtained through particle formation may be further subjected to a mechanical treatment or mechanochemical treatment to regulate the particle shape thereof and thereby regulate the aspect ratio thereof, as in the case of preparing the negative-electrode active material described above.

The positive-electrode active material to be used may be one of particulate active materials obtained by those and other methods or may be a mixture of two or more of these.

<Tap Densities of Active Materials>

The upper limit of the tap density of the positive-electrode active material to be used in the invention is generally 3.5 $g/cm^3$ or lower, in particular 3.0 $g/cm^3$ or lower, especially 2.5 $g/cm^3$ or lower, particularly 2.3 $g/cm^3$ or lower, and the lower limit thereof is generally 1.4 $g/cm^3$ or higher, in particular 1.7 $g/cm^3$ or higher, especially 2.0 $g/cm^3$ or higher.

Furthermore, the upper limit of the tap density of the negative-electrode active material is generally 1.5 $g/cm^3$ or lower, in particular 1.3 $g/cm^3$ or lower, especially 1.2 $g/cm^3$ or lower, and the lower limit thereof is generally 0.7 $g/cm^3$ or higher, in particular 0.8 $g/cm^3$ or higher, especially 0.9 $g/cm^3$ or higher.

Tap densities of each active material exceeding the upper limit are undesirable because properties other than tap density cannot be maintained. Use of an active material having a tap density lower than the lower limit results in a low electrode packing density and an insufficient increase in battery capacity and, hence, the cycle characteristics-improving effect of the invention is not sufficiently obtained.

The term "tap density" as used in this description means the density determined by measuring the bulk density after 1,000 taps for packing in a 20-$cm^3$ cell and taking this bulk density ($\rho1000$) as the ultimate bulk density $\rho$.

<Preferred Values of Other Properties of Positive-Electrode Active Material>

The average secondary-particle diameter (average diameter of secondary particles) of the positive-electrode active-material particles, as measured with a laser diffraction type particle diameter distribution analyzer, is generally 1 μm or larger, preferably 3 μm or larger, most preferably 6 μm or larger. In case where this average particle diameter of the active material is too small, it is difficult to form an active-material layer having a high density. Conversely, in case where that average particle diameter is too large, there is a possibility that active-material particles might protrude from the surface of the active-material layer and penetrate the separator to cause short-circuiting. Consequently, the upper limit of the average secondary-particle diameter of the active-material particles is preferably 30 μm or smaller, especially 26 μm or smaller. It is also preferred that the positive-electrode active material should contain substantially no particles each having a diameter of 50 μm or larger, especially 100 μm or larger.

Furthermore, the BET specific surface area of the positive-electrode active-material particles as measured by the nitrogen adsorption method is generally 0.3 $m^2/g$ or larger, preferably 0.5 $m^2/g$ or larger, more preferably 1.0 $m^2/g$ or larger, even more preferably 2.0 $m^2/g$ or larger, most preferably 3.0 $m^2/g$ or larger. Too small specific surface areas thereof are undesirable because this means that the primary-particle diameter is too large, namely, rate characteristics and capacity tend to decrease. On the other hand, in case where the specific surface area thereof is too large, side reactions in the battery proceed to reduce battery durability such as cycle characteristics and storability. Consequently, the upper limit of the specific surface area of the positive-electrode active-material particles is generally 10.0 $m^2/g$ or smaller, preferably 8.0 $m^2/g$ or smaller, more preferably 5.0 $m^2/g$ or smaller, most preferably 4.0 $m^2/g$ or smaller.

<Preferred Values of Other Properties of Negative-Electrode Active Material>

The average secondary-particle diameter (average diameter of secondary particles) of the negative-electrode active-material particles, as measured with a laser diffraction type particle diameter distribution analyzer, is generally 3 μm or larger, most preferably 6 μm or larger, especially 8 μm or larger. In case where this average particle diameter of the active material is too small, it is difficult to form an active-material layer having a high density. Conversely, in case where that average particle diameter is too large, there is a possibility that active-material particles might protrude from the surface of the active-material layer and penetrate the separator to cause short-circuiting. Consequently, the upper limit of the average secondary-particle diameter of the active-material particles is preferably 30 μm or smaller, especially 26 μm or smaller. It is also preferred that the negative-electrode active material should contain substantially no particles each having a diameter of 50 μm or larger, especially 100 μm or larger.

The BET specific surface area of the negative-electrode active-material particles as measured by the nitrogen adsorption method is generally preferably 0.5-20 $m^2/g$. The upper limit of the BET specific surface area thereof is more preferably 10 $m^2/g$ or smaller, especially 5 $m^2/g$ or smaller. The lower limit thereof varies depending on properties required of the battery. The lower limit thereof may be 0.5 $m^2/g$ or larger for applications where storability is important, such as standby use. However, for public uses such as domestic electrical appliances, where both current discharge characteristics and storability are required, the lower limit of the BET specific surface area thereof is preferably 1.0 $m^2/g$ or larger. For automotive applications where high-current discharge is required, the lower limit thereof is preferably 2.0 $m^2/g$ or larger.

The average sphericity of the negative-electrode active-material particles is preferably 0.85 or higher, in particular 0.89 or higher, especially 0.92 or higher. In case where a carbonaceous material having a low average sphericity is used, it is generally difficult to produce a negative electrode having excellent high-rate charge/discharge characteristics. Conversely, in case where a negative-electrode active material having too high an average sphericity is used, it shows reduced adhesion to a binder in negative-electrode production and, hence, the resultant negative electrode has reduced strength to deteriorate the long-term charge/discharge cycle characteristics of the battery. Consequently, the upper limit of the average sphericity of the negative-electrode active material is preferably 0.99 or lower, especially 0.97 or lower.

The term sphericity herein means an index defined as the ratio of the circumference of a true circle (corresponding circle) having the same projected area as the particle to the length of the periphery of the particle. Consequently, in the case of a particle whose projected image is a true circle, the sphericity thereof is 1. The more the particle is elongated or rough, the lower the sphericity. The term "average sphericity" in this description is a value determined by examining the particles with a flow type particle image analyzer to pick up the images of 9,000-11,000 particles, determining the sphericities of these particles, and calculating the arithmetic average thereof. For the sphericity measurement, a sample prepared by adding the carbon material to be examined and a surfactant (poly(oxyethylene (20)) sorbitan monolaurate) to ion-exchanged water as a dispersion medium, stirring the mixture, and subjecting it to a 30-minute ultrasonic dispersion treatment is used.

The true density of the particulate negative-electrode active material for use in the invention, as measured by the pycnometer method, is such that the upper limit thereof is generally preferably 2.40 $g/cm^3$ or lower, in particular 2.30 $g/cm^3$ or lower, especially 2.28 $g/cm^3$ or lower, and the lower limit thereof is generally preferably 1.70 $g/cm^3$ or higher, in particular 1.80 $g/cm^3$ or higher, especially 2.10 $g/cm^3$ or higher. True densities of the negative-electrode active material exceeding the upper limit are undesirable because this active material shows enhanced deterioration in cycle characteristics. In case where the true density of the active material is lower than the lower limit, this active material has a reduced capacity and the cycle characteristics-improving effect of the invention is not sufficiently obtained.

The interplanar spacing ($d_{002}$) of the graphitic carbon material to be used as the negative-electrode active material is preferably 0.348 nm or smaller, more preferably 0.338 nm or smaller, especially 0.337 nm or smaller. A graphitic carbon material in which the crystallite thickness in the c-axis direction ($L_c$) is 2 nm or larger is generally usable. The crystallite thickness ($L_c$) thereof is preferably 20 nm or larger, more preferably 40 nm or larger, especially 90 nm or larger.

Furthermore, this graphitic carbon material preferably has the following properties. In a Raman spectrum obtained with argon ion laser light having a wavelength of 514.3 nm, when the peak intensity at 1,580-1,620 $cm^{-1}$, the half-value width of this peak, and the peak intensity at 1,350-1,370 $cm^{-1}$ are expressed as $I_A$, $\Delta v$, and $I_B$, respectively, then the peak intensity ratio R ($=I_B/I_A$) is preferably 0.7 or smaller. The peak intensity ratio R is more preferably 0.6 or smaller, especially 0.4 or smaller, provided that the ratio preferably is not smaller than 0.2. Furthermore, the half-value width $\Delta v$ is preferably 40 $cm^{-1}$ or smaller, more preferably 36 $cm^{-1}$ or smaller. Although smaller values of half-value with $\Delta v$ are generally preferred, it is generally 20 $cm^{-1}$ or larger.

As is well known, the theoretical capacity per g of graphite based on $C_6Li$, which is an intercalation compound formed by the introduction of lithium ions between graphite layers, is 372 mAh. A graphitic carbon material preferred for use as the negative-electrode active material in the invention is one whose capacity is 320 mAhr/g or higher when measured with a half battery employing lithium metal as the counter electrode at a charge/discharge rate of 0.2 $mA/cm^2$. This capacity is more preferably 340 mAhr/g or higher, especially 350 mAhr/g or higher.

[Positive Electrode]

As the positive electrode is generally used one obtained by forming on a current collector an active-material layer comprising a positive-electrode active material such as those described above and a binder.

The positive-electrode active material is not particularly limited in kind as long as it is capable of electrochemically occluding/releasing lithium ions. Preferred examples thereof include lithium/transition metal composite oxides.

Specific examples of the lithium/transition metal composite oxides include lithium/cobalt composite oxides such as $LiCoO_2$, lithium/nickel composite oxides such as $LiNiO_2$, and lithium/manganese composite oxides such as $LiMnO_2$. These lithium/transition metal composite oxides preferably are ones in which part of the transition metal atoms as a major component have been replaced by one or more other metals such as Al, Ti, V, Cr. Mn, Fe, Co, Li, Ni, Cu, Zn, Mg, Ga, Zr, and Si, because this replacement can stabilize the oxides. Any one of these positive-electrode active materials may be used alone, or any combination of two or more thereof may be used in any desired proportion.

The binder is not particularly limited as long as it is a material stable to the solvent and electrolyte solution to be used in electrode production and to other materials to be used when the battery is used. Specific examples thereof include poly(vinylidene fluoride), polytetrafluoroethylene, fluorinated poly(vinylidene fluoride), EPDM (ethylene/propylene/diene terpolymers), SBR (styrene/butadiene rubbers), NBR (acrylonitrile/butadiene rubbers), fluororubbers, poly(vinyl acetate), poly(methyl methacrylate), polyethylene, and nitrocellulose. These may be used alone or in combination of two or more thereof.

The proportion of the binder in the positive-electrode active-material layer is such that the upper limit thereof is generally 0.1% by weight or higher, preferably 1% by weight or higher, more preferably 5% by weight or higher, and the upper limit thereof is generally 80% by weight or lower, preferably 60% by weight or lower, more preferably 40% by weight or lower, even more preferably 10% by weight or lower. In case where the proportion of the binder is too low, the active material cannot be sufficiently held and, hence, the positive electrode may have insufficient mechanical strength to impair battery performances such as cycle characteristics. Conversely, too high proportions thereof result in a reduced battery capacity and reduced conductivity.

The positive-electrode active-material layer generally contains a conductive material so as to have enhanced conductivity. Examples of the conductive material include carbonaceous materials such as fine particles of graphites, e.g., natural graphite and artificial graphite, carbon blacks, e.g., acetylene black, and fine particles of amorphous carbon, e.g., needle coke. These may be used alone or in combination of two or more thereof.

The proportion of the conductive material in the positive-electrode active-material layer is such that the lower limit thereof is generally 0.01% by weight or higher, preferably 0.1% by weight or higher, more preferably 1% by weight or higher, and the upper limit thereof is generally 50% by weight or lower, preferably 30% by weight or lower, more preferably 15% by weight or lower. Too low proportions of the conductive material may result in insufficient conductivity. Conversely, too high proportions thereof may result in a reduced battery capacity.

Additives for ordinary active-material layers, such as, e.g., a thickener, can be further incorporated into the positive-electrode active-material layer.

The thickener is not particularly limited as long as it is a material stable to the solvent and electrolyte solution to be used in electrode production and to other materials to be used when the battery is used. Specific examples thereof include carboxymethyl cellulose, methyl cellulose, hydroxymethyl cellulose, ethyl cellulose, poly (vinyl alcohol), oxidized starch, phosphated starch, and casein. These may be used alone or in combination of two or more thereof.

As the current collector of the positive electrode may be used aluminum, stainless steel, nickel-plated steel, or the like.

The positive electrode can be formed by using a solvent to slurry the positive-electrode active material, binder, and conductive material described above and other additives added according to need, applying the slurry to the current collector, and drying the slurry. As the solvent for slurrying is generally used an organic solvent in which the binder is soluble. For example, use is made of N-methylpyrrolidone, dimethylformamide, dimethylacetamide, methyl ethyl ketone, cyclohexanone, methyl acetate, methyl acrylate, diethyltriamine, N,N-dimethylaminopropylamine, ethylene oxide, tetrahydrofuran, or the like. However, the solvent should not be construed as being limited to these. These organic solvents may be used alone or a combination of two or more thereof may be used. It is also possible to add a dispersant, thickener, etc. to water and to slurry the active material with a latex of, e.g., SBR.

The thickness of the positive-electrode active-material layer thus formed is generally about 10-200 μm. It is preferred that the active-material layer obtained through application/drying be pressed and densified with a roller press or the like in order to heighten the packing density of the active material.

[Negative Electrode]

As the negative electrode is generally used one obtained by forming on a current collector an active-material layer comprising a negative-electrode active material such as those described above and a binder.

Usable negative-electrode active materials include carbonaceous materials capable of occluding/releasing lithium, such as products of organic-matter pyrolysis conducted under various pyrolysis conditions, artificial graphite, and natural graphite; metal oxide materials capable of occluding/releasing lithium, such as tin oxide and silicon oxide; lithium metal; various lithium alloys and metallic materials capable of forming an alloy with lithium, such as silicon and tin; and the like. These negative-electrode active materials may be used alone or as a mixture of two or more thereof.

Especially when a film-forming agent is used, it is preferred to use a carbonaceous material among those negative-electrode active materials. This is because the film formed by the film-forming agent in a nonaqueous electrolyte solution in this case has appropriate resistance and appropriate temperature dependence of the resistance and, hence, the effects of the invention are more easily obtained.

Moreover, when a chain carbonate represented by formula (I) described above is used in the invention, it is preferred to use a carbonaceous material among those negative-electrode active-materials. This is because a stable film is apt to be formed in this case due to the chain carbonate represented by formula (I) in a nonaqueous electrolyte solution and, hence, the cycle characteristics-improving effect of the invention is more easily obtained.

Furthermore, the carbonaceous materials among those negative-electrode active materials are preferred from the standpoint of the safety and storability of the battery and from the standpoint that when the battery is used at a high voltage, the positive-electrode potential is less apt to become high. Namely, the carbonaceous materials are preferred for more easily obtaining the effects of the invention.

The binder is not particularly limited as long as it is a material stable to the solvent and electrolyte solution to be used in electrode production and to other materials to be used when the battery is used. Specific examples thereof include poly(vinylidene fluoride), polytetrafluoroethylene, styrene/butadiene rubbers, isoprene rubbers, and butadiene rubbers. These may be used alone or in combination of two or more thereof.

The proportion of the binder in the negative-electrode active-material layer is such that the upper limit thereof is generally 0.1% by weight or higher, preferably 1% by weight or higher, more preferably 5% by weight or higher, and the upper limit thereof is generally 80% by weight or lower, preferably 60% by weight or lower, more preferably 40% by weight or lower, even more preferably 10% by weight or lower. In case where the proportion of the binder is too low, the active material cannot be sufficiently held and, hence, the negative electrode may have insufficient mechanical strength to impair battery performances such as cycle characteristics. Conversely, too high proportions thereof result in a reduced battery capacity and reduced conductivity.

Additives for ordinary active-material layers, such as, e.g., a thickener, can be further incorporated into the negative-electrode active-material layer.

The thickener is not particularly limited as long as it is a material stable to the solvent and electrolyte solution to be used in electrode production and to other materials to be used when the battery is used. Specific examples thereof include carboxymethyl cellulose, methyl cellulose, hydroxymethyl cellulose, ethyl cellulose, poly (vinyl alcohol), oxidized starch, phosphated starch, and casein. These may be used alone or in combination of two or more thereof.

As the current collector of the negative electrode may be used copper, nickel, stainless steel, nickel-plated steel, or the like.

The negative electrode can be formed by using a solvent to slurry the negative-electrode active material and binder described above and other additives added according to need, applying the slurry to the current collector, and drying the slurry. As the solvent for slurrying is generally used an organic solvent in which the binder is soluble. For example, use is made of N-methylpyrrolidone, dimethylformamide, dimethylacetamide, methyl ethyl ketone, cyclohexanone, methyl acetate, methyl acrylate, diethyltriamine, N,N-dimethylaminopropylamine, ethylene oxide, tetrahydrofuran, or the like. However, the solvent should not be construed as being limited to these. These organic solvents may be used alone or a combination of two or more thereof may be used. It is also possible to add a dispersant, thickener, etc. to water and to slurry the active material with a latex of, e.g., SBR.

The thickness of the negative-electrode active-material layer thus formed is generally about 10-200 μm. It is preferred that the active-material layer obtained through application/drying be pressed and densified with a roller press or the like in order to heighten the packing density of the active material.

[Battery Constitution]

The lithium secondary battery of the invention can be produced by assembling the positive electrode, negative electrode, nonaqueous electrolyte solution, and separator described above into an appropriate shape. Other constituent elements such as, e.g., an outer case can be used according to need.

The shape of the battery is not particularly limited and can be suitably selected, according to the use of the battery, from various shapes generally employed. Examples of the shapes generally employed include the cylinder type in which sheet electrodes and separators are spirally packed, the cylinder type of the inside-out structure employing a combination of pellet electrodes and a separator, the coin type in which pellet electrodes and a separator are superposed, and the laminate type in which sheet electrodes and a separator are superposed. Methods for battery fabrication also are not particularly limited, and a suitable one can be selected, according to the intended battery shape, from various methods in general use.

[Water Amount in Battery]

The nonaqueous-electrolyte secondary battery of the invention preferably is one in which the amount of water contained in the battery is in a specific range in terms of water amount in the electrolyte solution. This water amount is generally 200 ppm or larger, preferably 250 ppm or larger, and is generally 500 ppm or smaller, preferably 300 ppm or smaller.

In case where the water amount in the battery is smaller than that range, the amount of the contributive substance generated, which is effective in reducing electrode surface resistance as described above, is too small to reduce the surface resistance. Water amounts in the battery larger than that range are undesirable because hydrofluoric acid is generated by the reaction of water with the salt present in the electrolyte solution and deteriorates the electrode active materials, resulting in a decrease in capacity.

For measuring the water amount in the battery, any desired known technique can be used. When the battery has not been fabricated, use may be made of a method in which the amount of water contained in each constituent member is measured and the sum of these is determined. When the battery has been fabricated, use may be made of a method in which the amount of water contained in the electrolyte solution in the battery is measured because the water present in the battery speedily collects in the electrolyte solution as stated above.

The water amount in the electrode materials and separator to be used for battery fabrication may be measured in the following manner.

<Water Amount in Electrode Materials and Separator>

A test sample is placed in a 130° C. heating oven through which nitrogen gas is kept flowing, and is held therein for 20 minutes. The nitrogen gas which has flowed is introduced into the measuring cell of a Karl Fischer's moisture meter to determine the water amount. The integrated amount for the 20 minutes is defined as the total amount of water contained. This measurement is made in a gloved box having a dew point of −75° C. in order to prevent moisture inclusion.

Furthermore, the water amount in an electrolyte solution may be measured in the following manner.

<Water Amount in Electrolyte solution>

In an electrolyte solution, the water present in a small amount rapidly reacts with the lithium salt in the electrolyte solution to become HF. It is therefore possible to use a method in which the amount of HF is measured by, e.g., acid determination and the water amount is calculated from this found value. Techniques for measuring the amount of water present in the electrolyte solution in a battery are not limited, and use may be made of a method in which in a sealed vessel free from moisture inclusion, the battery is disassembled and the electrolyte solution is taken out and subjected to the water amount measurement described above.

Although techniques for measuring the amount of water present in the electrolyte solution in a battery are not limited, use may be made of a method in which in a closed vessel, the battery is disassembled and the electrolyte solution is taken out and subjected to the water amount measurement described above.

In the invention, it is important in fabricating the battery of the invention that the amount of the water to be carried in the battery by the members be regulated and conditions of atmospheres such as a fabrication atmosphere be regulated with respect to moisture content, in order that the water amount in the battery be within the specific range. Namely, the members to be used are stored in a suitable manner according to the target total water amount in the battery. For example, the moisture content in the storage atmosphere is controlled or the members are protected with a material which does not absorb moisture. During battery fabrication also, it is necessary to take a measure, e.g., to take care in regulating the moisture content in an atmosphere such as dry air. Thus, the total amount of water contained in the positive-electrode material, negative-electrode material, and separator is regulated to generally 200 ppm or larger, preferably 250 ppm or larger, and to generally 500 ppm or smaller, preferably 300 ppm or smaller, in terms of water amount based on the electrolyte solution, whereby the battery of the invention can be produced.

General embodiments of the lithium secondary battery of the invention were explained above. However, the lithium secondary battery of the invention should not be construed as being limited to those embodiments, and various modifications can be made in carrying out the invention as long as they do not depart from the spirit of the invention.

EXAMPLES

The invention will be explained below in more detail by reference to Examples and Comparative Examples, but the invention should not be construed as being limited to these Examples unless the invention departs from the spirit thereof.

Example 1-1

<Production of Separator>

A hundred parts by weight of high-density polyethylene ["HI-ZEX7000FP" manufactured by Mitsui Chemicals, Inc.; weight-average molecular weight, 200,000; density, 0.956 g/cm$^3$; melt flow rate, 0.04 g/10 min] was mixed with 8.8 parts by weight of flexible polypropylene ["PERR110E" manufactured by Idemitsu Petrochemical Co., Ltd.; weight-average molecular weight, 330,000], 8.8 parts by weight of hardened castor oil ["HY-CASTOR OIL" manufactured by Hokoku Oil Mill Co., Ltd.; molecular weight, 938], and 176.5 parts by weight of barium sulfate [number-average particle diameter, 0.18 μm] as an inorganic filler. The resultant mixture was melt-kneaded. The resin composition obtained was subjected to inflation molding at a temperature of 210° C. to obtain a raw sheet. The thickness of this raw sheet was 105 μm on the average.

Subsequently, the raw sheet obtained was subjected to successive stretching in which the sheet was stretched first at 90° C. in the machine direction (MD) 4 times and then at 120° C. in the transverse direction (TD) 2.9 times. Thus, a porous polymer film was obtained which had a film thickness of 26 μm, porosity of 64%, average pore diameter (the average pore diameter as provided for in ASTM F316-86) of 0.27 μm, and Gurley air permeability (the Gurley air permeability as provided for in JIS P8117) of 44 sec/100 cc. This porous polymer film is referred to as separator A. Inorganic-filler shedding from the porous polymer film was not observed during the stretching.

This separator A had an average rate of change in retained-liquid amount, as determined by the method described above, of 9.2%/min.

<Preparation of Nonaqueous Electrolyte Solution>

In a dry argon atmosphere, purified ethylene carbonate was mixed with dimethyl carbonate in a ratio of 3:7 by volume to prepare a mixed solvent. Sufficiently dried LiPF$_6$ was dissolved in this mixed solvent in such an amount as to result in a proportion of 1.0 mol/L to thereby obtain a nonaqueous electrolyte solution.

<Production of Positive Electrode>

LiCoO$_2$ having the properties shown in Table 3 was used as a positive-electrode active material. To 85 parts by weight of the LiCoO$_2$ were added 6 parts by weight of carbon black and 9 parts by weight of poly(vinylidene fluoride) (trade name "KF-1000" manufactured by Kureha Chemical Industry Co., Ltd.). The ingredients were mixed together and dispersed with N-methyl-2-pyrrolidone to prepare a slurry. This slurry was evenly applied to one side of a 20 μm-thick aluminum foil as a positive-electrode current collector and dried. Thereafter, the coated foil was pressed with a pressing machine so as to result in a positive-electrode active-material layer having a density of 3.0 g/cm$^3$ to thereby obtain a positive electrode.

<Production of Negative Electrode>

With 94 parts by weight of a powder of natural graphite having the properties shown in Table 3, as a negative-electrode active material, was mixed 6 parts by weight of poly(vinylidene fluoride). The ingredients were dispersed with N-methyl-2-pyrrolidone to prepare a slurry. This slurry was evenly applied to one side of an 18 μm-thick copper foil as a negative-electrode current collector and dried. Thereafter, the coated foil was pressed with a pressing machine so as to result in a negative-electrode active-material layer having a density of 1.5 g/cm$^3$ to thereby obtain a negative electrode.

<Battery Fabrication>

The separator A, nonaqueous electrolyte solution, positive electrode, and negative electrode were used to produce a cylindrical battery of the 18650 type (lithium secondary battery of Example 1-1). Namely, the positive electrode and negative electrode and the separator A interposed between these were wound into a roll to obtain an electrode group, which was put in a battery can. This battery can was sealed. Thereafter, 5 mL of the electrolyte solution was introduced into the battery can having the electrode group packed therein, and was sufficiently infiltrated into the electrodes. This battery can was then caulked.

<Evaluation of Battery>

1) Initial Charge/Discharge

At 25° C., the battery was subjected to 3 cycles of charge/discharge in which the battery was charged and discharged to a final charge voltage of 4.2 V and a final discharge voltage of 3 V, respectively, at a current corresponding to 0.2 C (the current value at which the rated capacity which is the 1-hour-rate discharge capacity is discharged over 1 hour is referred to as 1 C; the same applies hereinafter) to stabilize the battery. In the fourth cycle, the battery was subjected to 4.2-V constant-current constant-voltage charge (CCCV charge) (0.05 C cut) in which the battery was charged to a final charge voltage of 4.2 V at a current corresponding to 0.5 C and charged until the charge current reached the current value corresponding to 0.05 C. Thereafter, the battery was subjected to 3-V discharge at a constant current corresponding to 0.2 C. The final discharge capacity in this operation was taken as initial capacity.

2) Cycle Test

A cycle test was conducted in the following manner. The battery which had undergone the 1) initial charge/discharge was charged by the constant-current constant-voltage method at 2 C to a final charge voltage of 4.2 V and then discharged at a constant current of 2 C to a final discharge voltage of 3.0V. This charge/discharge operation as one cycle was repeated to conduct 500 cycles. This cycle test was conducted at 25° C. After this cycle test, the same charge/discharge as the 1) initial charge/discharge was conducted. The proportion of the final discharge capacity in this operation to the initial capacity is shown as cycle durability in Table 3.

Example 1-2

A cylindrical battery of the 18650 type (lithium secondary battery of Example 1-2) was produced in the same manner as in Example 1-1, except that natural graphite having the properties shown in Table 3 was used as a negative-electrode active material and LiNiMnO$_2$ (Li:Ni:Mn=1.05:0.50:0.50 (by mole)) having the properties shown in Table 3 which had been sphered by a treatment with a spray drier of the four-fluid nozzle type was used as a positive-electrode active material. This battery was evaluated in the same manner, and the results thereof are shown in Table 3.

Example 1-3

A cylindrical battery of the 18650 type (lithium secondary battery of Example 1-3) was produced in the same manner as in Example 1-1, except that natural graphite having the properties shown in Table 3 which had been sphered was used as a negative-electrode active material and LiNiMnO$_2$ (Li:Ni:Mn=1.05:0.50:0.50 (by mole)) having the properties shown in Table 3 was used as a positive-electrode active material. This battery was evaluated in the same manner, and the results thereof are shown in Table 3.

Example 1-4

A hundred parts by weight of high-density polyethylene ["HI-ZEX7000FP" manufactured by Mitsui Chemicals, Inc.; weight-average molecular weight, 200,000; density, 0.956 g/cm$^3$; melt flow rate, 0.04 g/10 min] was mixed with 8.8 parts by weight of flexible polypropylene ["PERR110E" manufactured by Idemitsu Petrochemical Co., Ltd.; weight-average molecular weight, 330,000], 8.8 parts by weight of hardened castor oil ["HY-CASTOR OIL" manufactured by Hokoku Oil Mill Co., Ltd.; molecular weight, 938], and 117.6 parts by weight of barium sulfate [number-average particle diameter, 0.17 μm] as an inorganic filler. The resultant mixture was melt-kneaded. The resin composition obtained was subjected to inflation molding at a temperature of 210° C. to obtain a raw sheet. The thickness of this raw sheet was 110 μm on the average.

Subsequently, the raw sheet obtained was subjected to successive stretching in which the sheet was stretched first at 90° C. in the machine direction (MD) 4 times and then at 120° C. in the transverse direction (TD) 2.9 times. Thus, a porous polymer film was obtained which had a film thickness of 25 μm, porosity of 61%, average pore diameter of 0.19 μm, and Gurley air permeability of 85 sec/100 cc. This porous polymer film is referred to as separator B. Inorganic-filler shedding from the porous polymer film was not observed during the stretching.

This separator B had an average rate of change in retained-liquid amount, as determined by the method described above, of 1.3%/min.

A cylindrical battery of the 18650 type (lithium secondary battery of Example 1-4) was produced in the same manner as in Example 3, except that separator B was used as the separator. This battery was evaluated in the same manner, and the results thereof are shown in Table 3.

Comparative Example 1-2

A cylindrical battery of the 18650 type (lithium secondary battery of Comparative Example 1-1) was produced in the same manner as in Example 1-1, except that natural graphite having the properties shown in Table 3 was used as a negative-electrode active material and LiCoO$_2$ having the properties shown in Table 3 was used as a positive-electrode active material. This battery was evaluated in the same manner, and the results thereof are shown in Table 2.

Comparative Example 1-2

A mixture of 25 parts by weight of a polyethylene having a viscosity-average molecular weight of 1,000,000 and 75 parts by weight of a paraffin wax (average molecular weight, 389) was subjected to extrusion inflation at an extrusion temperature of 170° C. with a twin-screw extruder having a diameter of 40 mm to produce a raw film. The raw film obtained was immersed in 60° C. isopropanol to extract/remove the paraffin wax. The film obtained was longitudinally stretched 2.0 times at a temperature of 90° C. using stretching rolls and then stretched 6.0 times with a tenter at a temperature of 100° C. to obtain a porous film having a film thickness of 22 μm, porosity of 50%, average pore diameter of 0.04 μm, and Gurley air permeability of 440 sec/100 cc. This porous polymer film is referred to as separator C.

This separator C had an average rate of change in retained-liquid amount, as determined by the method described above, of 17.2%/min.

A cylindrical battery of the 18650 type (lithium secondary battery of Comparative Example 1-2) was produced in the same manner as in Example 1-3, except that separator C was used as the separator. This battery was evaluated in the same manner, and the results thereof are shown in Table 3.

Incidentally, the separator C of Comparative Example 1-2 had been regulated so as to have almost the same areal stretch ratio (about 12) as the separators A and B of Examples 1-3 and 1-4 in order to clearly show the effect of the presence or absence of a filler.

TABLE 3

| | Negative-electrode active material | | | | | |
| --- | --- | --- | --- | --- | --- | --- |
| Example | Kind | Tap density (g/cm$^3$) | Average secondary-particle diameter (μm) | Two-dimensional aspect ratio | Three-dimensional aspect ratio | Average sphericity | Positive-electrode active material Kind |
| Ex. 1-1 | natural graphite | 0.98 | 16.8 | 1.9 | 2.3 | 0.95 | LiCoO$_2$ |
| Ex. 1-2 | natural graphite | 0.57 | 12.4 | 3.2 | 3.7 | 0.81 | LiNiMnO$_2$ |
| Ex. 1-3 | natural graphite | 1.0 | 22.4 | 1.5 | 1.7 | 0.94 | LiNiMnO$_2$ |
| Comp. Ex. 1-1 | natural graphite | 0.57 | 12.4 | 3.2 | 3.7 | 0.81 | LiCoO$_2$ |
| Ex. 1-4 | natural graphite | 1.0 | 22.4 | 1.5 | 1.7 | 0.94 | LiNiMnO$_2$ |
| Comp. Ex. 1-2 | natural graphite | 1.0 | 22.4 | 1.5 | 1.7 | 0.94 | LiNiMnO$_2$ |

| | Positive-electrode active material | | | | | |
| --- | --- | --- | --- | --- | --- | --- |
| Example | Tap density (g/cm$^3$) | Average secondary-particle diameter (μm) | Two-dimensional aspect ratio | Three-dimensional aspect ratio | Kind of separator | Cycle durability (%) |
| Ex. 1-1 | 1.3 | 6.3 | 2.5 | 3.0 | A | 81.3 |
| Ex. 1-2 | 1.7 | 8.9 | 1.3 | 1.4 | A | 80.3 |
| Ex. 1-3 | 1.7 | 8.9 | 1.3 | 1.4 | A | 81.7 |

TABLE 3-continued

| | | | | | | |
|---|---|---|---|---|---|---|
| Comp. Ex. 1-1 | 1.3 | 6.3 | 2.5 | 3.0 | A | 77.3 |
| Ex. 1-4 | 1.7 | 8.9 | 1.3 | 1.4 | B | 80.5 |
| Comp. Ex. 1-2 | 1.7 | 8.9 | 1.3 | 1.4 | C | 75.3 |

Table 3 given above clearly shows the following. The lithium secondary batteries of Examples 1-1 to 1-4, which employ a particulate active material having a low aspect ratio as the negative-electrode active material and/or positive-electrode active material and have a separator made of a thermoplastic resin containing an inorganic filler, show better cycle characteristics than Comparative Example 1-1, in which neither the negative-electrode active material nor the positive-electrode active material is a particulate active material having a low aspect ratio, and than Comparative Example 1-2, which employs a separator obtained by the extraction method which contains no inorganic filler and has a small pore diameter.

In Examples 1-3 and 1-4 and Comparative Example 1-2, the same negative-electrode active material and the same positive-electrode active material were used to from negative electrodes having the same density and positive electrodes having the same density. They differ only in the separators used.

Separator C, which was produced by the extraction method and used in Comparative example 1-2, is one obtained by stretching a raw sheet having the same thickness as the raw sheets for separators A and B, which were produced by the interfacial separation method and used in Examples 1-3 and 1-4, in the same areal stretch ratio (about 12) as these raw sheets. However, these separators considerably differ in average pore diameter; separators A and B respectively have average pore diameters of 0.27 μm and 0.19 μm, while separator C has an average pore diameter of 0.04 μm. Furthermore, separators A and B have excellent electrolyte solution retentivity with average rates of change in retained-liquid amount of 9.2%/min and 11.3%/min, respectively, whereas separator C has poor liquid retentivity with an average rate of change in retained-liquid amount of 17.2%/min. Thus, separators A and B considerably differ from separator C in average pore diameter and are utterly different from separator C also in liquid retentivity. Because of this, in Examples 3 and 4, which employ separators A and B having a large pore diameter and satisfactory liquid retentivity, troubles such as the clogging caused by side-reaction products generated by the high-density packing of a particulate active material having a low aspect ratio, the state of being deficient in an electrolyte solution, and the increase in internal battery resistance attributable to side-reaction products have been alleviated, whereby satisfactory cycle characteristics are attained. In contrast, in Comparative Example 1-2, which employs separator C having a small pore diameter and poor liquid retentivity, such effects are not obtained and the battery has reduced cycle characteristics.

Incidentally, in film formation by the extraction method, even when the stretch ratio is increased, the porous film obtained does not have a sufficiently enlarged pore diameter because the increase in stretch ratio results in densification (thickness-direction shrinkage caused by stretching). There are case where the increase in stretch ratio reduces rather than increases the pore diameter. It is therefore difficult to realize a separator effective in improving liquid retentivity.

Comparative Example 1-1 employs separator A. However, since both the negative-electrode active material and positive-electrode active material used have a high aspect ratio, this battery cannot have an increased capacity and hence has poor cycle characteristics.

Example 2-1

<Production of Separator>

A hundred parts by weight of high-density polyethylene ["HI-ZEX7000FP" manufactured by Mitsui Chemicals, Inc.; weight-average molecular weight, 200,000; density, 0.956 g/cm$^3$; melt flow rate, 0.04 g/10 min] was mixed with 8.8 parts by weight of flexible polypropylene ["PERR110E" manufactured by Idemitsu Petrochemical Co., Ltd.; weight-average molecular weight, 330,000], 8.8 parts by weight of hardened castor oil ["HY-CASTOR OIL" manufactured by Hokoku Oil Mill Co., Ltd.; molecular weight, 938], and 176.5 parts by weight of barium sulfate [number-average particle diameter, 0.18 μm] as an inorganic filler. The resultant mixture was melt-kneaded. The resin composition obtained was subjected to inflation molding at a temperature of 210° C. to obtain a raw sheet. The thickness of this raw sheet was 105 μm on the average. Subsequently, the raw sheet obtained was subjected to successive stretching in which the sheet was stretched first at 90° C. in the machine direction (MD) 4 times and then at 120° C. in the transverse direction (TD) 2.9 times. Thus, a porous polymer film was obtained which had a film thickness of 26 μm, porosity of 64%, average pore diameter (the average pore diameter as provided for in ASTM F316-86) of 0.27 μm, and Gurley air permeability (the Gurley air permeability as provided for in JIS P8117) of 44 sec/100 cc. This porous polymer film is referred to as separator A. Inorganic-filler shedding from the porous polymer film was not observed during the stretching.

<Preparation of Nonaqueous Electrolyte Solution>

In a dry argon atmosphere, purified ethylene carbonate was mixed with diethyl carbonate in a ratio of 3:7 by volume to prepare a mixed solvent. Sufficiently dried LiPF$_6$ was dissolved in this mixed solvent in such an amount as to result in a proportion of 1.0 mol/L. Thereafter, vinylene carbonate (VC) was mixed therewith in such an amount as to result in a proportion of 2% by weight in terms of concentration in the nonaqueous electrolyte solution to thereby obtain a nonaqueous electrolyte solution.

<Production of Positive Electrode>

LiCoO$_2$ was used as a positive-electrode active material. To 85 parts by weight of LiCoO$_2$ were added 6 parts by weight of carbon black and 9 parts by weight of poly(vinylidene fluoride) (trade name "KF-1000" manufactured by Kureha Chemical Industry Co., Ltd.). The ingredients were mixed together and dispersed with N-methyl-2-pyrrolidone to prepare a slurry. This slurry was evenly applied to one side of a 20 μm-thick aluminum foil as a positive-electrode current collector and dried. Thereafter, the coated foil was pressed with a pressing machine so as to result in a positive-electrode active-material layer having a density of 3.0 g/cm$^3$ to thereby obtain a positive electrode.

<Production of Negative Electrode>

A powder of natural graphite which had been sphered (the same graphite as in Example 1-3) was used as a negative-electrode active material. With 94 parts by weight of the powder of natural graphite was mixed 6 parts by weight of poly(vinylidene fluoride). The ingredients were dispersed with N-methyl-2-pyrrolidone to prepare a slurry. This slurry was evenly applied to one side of an 18 μm-thick copper foil as a negative-electrode current collector and dried. Thereafter, the coated foil was pressed with a pressing machine so as to result in a negative-electrode active-material layer having a density of 1.5 g/cm$^3$ to thereby obtain a negative electrode.

<Battery Fabrication>

The separator A, nonaqueous electrolyte solution, positive electrode, and negative electrode were used to produce a coin cell of the 2032 type. Namely, the positive electrode which had been cut by punching into a disk form having a diameter of 12.5 mm and had been impregnated with the electrolyte solution was placed in a stainless-steel can serving also as a positive-electrode conductor. The negative electrode which had been cut by punching into a disk form having a diameter of 12.5 mm and had been impregnated with the electrolyte solution was placed on the positive electrode through the separator having a diameter of 18.8 mm impregnated with the electrolyte solution. A battery cover serving also as a negative-electrode conductor was applied to the can through a gasket for insulation so that the resultant structure was caulked and sealed. Thus, a coin battery was produced. The impregnation of the battery members with the electrolyte solution was conducted by immersing each member in the electrolyte solution for 2 minutes.

<Evaluation of Battery>

1) Initial Charge/Discharge

At 25° C., the battery was subjected to 3 cycles of charge/discharge in which the battery was charged and discharged to a final charge voltage of 4.2 V and a final discharge voltage of 3 V, respectively, at a current corresponding to 0.2 C (the current value at which the rated capacity which is the 1-hour-rate discharge capacity is discharged over 1 hour is referred to as 1 C; the same applies hereinafter) to stabilize the battery. In the fourth cycle, the battery was subjected to 4.2-V constant-current constant-voltage charge (CCCV charge) (0.05 C cut) in which the battery charged to a final charge voltage of 4.2 V at a current corresponding to 0.5 C and charged until the charge current reached the current value corresponding to 0.05 C. Thereafter, the battery was subjected to 3-V discharge at a constant current corresponding to 0.2 C.

2) Cycle Test

A cycle test was conducted in the following manner. The battery which had undergone the 1) initial charge/discharge was charged by the constant-current constant-voltage method at 2 C to a final charge voltage of 4.2 V and then discharged at a constant current of 2 C to a final discharge voltage of 3.0V. This charge/discharge operation as one cycle was repeated to conduct 100 cycles. This cycle test was conducted at 25° C. The proportion of the discharge capacity in the 100th cycle in this test to the discharge capacity in the 1st cycle is shown as cycle retention in Table 4.

3) Low-Temperature Rate Characteristics Examination

The battery which had undergone the 2) cycle test was subjected to 4.2-V constant-current constant-voltage charge CCCV charge) (0.05 C cut) in which the battery was charged to a final charge voltage of 4.2 V at a current corresponding to 0.5 C and charged until the charge current reached the current value corresponding to 0.05 C. Thereafter, the battery was subjected to 3-V discharge at a constant current corresponding to 0.2 C. The discharge capacity in this discharge was measured as a reference. In a low-temperature atmosphere of 0° C., the battery charged likewise was subjected to 3-V discharge at a constant current corresponding to 2 C. The proportion of the discharge capacity in this low-temperature discharge to that reference discharge capacity is shown in Table 4 as discharge efficiency.

Example 2-2

A hundred parts by weight of high-density polyethylene ["HI-ZEX7000FP" manufactured by Mitsui Chemicals, Inc.; weight-average molecular weight, 200,000; density, 0.956 g/cm$^3$; melt flow rate, 0.04 g/10 min] was mixed with 8.8 parts by weight of flexible polypropylene ["PERR110E" manufactured by Idemitsu Petrochemical Co., Ltd.; weight-average molecular weight, 330,000], 8.8 parts by weight of hardened castor oil ["HY-CASTOR OIL" manufactured by Hokoku Oil Mill Co., Ltd.; molecular weight, 938], and 117.6 parts by weight of barium sulfate [number-average particle diameter, 0.17 μm] as an inorganic filler. The resultant mixture was melt-kneaded. The resin composition obtained was subjected to inflation molding at a temperature of 210° C. to obtain a raw sheet. The thickness of this raw sheet was 110 μm on the average. Subsequently, the raw sheet obtained was subjected to successive stretching in which the sheet was stretched first at 90° C. in the machine direction (MD) 4 times and then at 120° C. in the transverse direction (TD) 2.9 times. Thus, a porous polymer film was obtained which had a film thickness of 25 μm, porosity of 61%, average pore diameter of 0.19 μm, and Gurley air permeability of 85 sec/100 cc. This porous polymer film is referred to as separator B. Inorganic-filler shedding from the porous polymer film was not observed during the stretching.

A coin battery (lithium secondary battery of Example 2-2) was produced in the same manner as in Example 2-1, except that separator B was used. This battery was evaluated in the same manner, and the results thereof are shown in Table 4.

Example 2-3

A coin battery (lithium secondary battery of Example 2-3) was produced in the same manner as in Example 2-1, except that in preparing the nonaqueous electrolyte solution, vinyl-ethylene carbonate (VEC) was incorporated in place of the vinylene carbonate in such an amount as to result in a proportion of 2% by weight in terms of concentration in the nonaqueous electrolyte solution. This battery was evaluated in the same manner, and the results thereof are shown in Table 4.

Comparative Example 2-1

A mixture of 25 parts by weight of a polyethylene having a viscosity-average molecular weight of 1,000,000 and 75 parts by weight of a paraffin wax (average molecular weight, 389) was subjected to extrusion inflation at an extrusion temperature of 170° C. with a twin-screw extruder having a diameter of 40 mm to produce a raw film. The raw film obtained was immersed in 60° C. isopropanol to extract/remove the paraffin wax. The film obtained was longitudinally stretched 2.0 times at a temperature of 90° C. using stretching rolls and then stretched 6.0 times with a tenter at a temperature of 100° C. to obtain a porous film having a film thickness of 22 μm, porosity of 50%, average pore diameter of 0.04 μm, and Gurley air permeability of 440 sec/100 cc. This porous polymer film is referred to as separator C.

A coin battery (lithium secondary battery of Comparative Example 2-1) was produced in the same manner as in Example 2-1, except that separator C was used. This battery was evaluated in the same manner, and the results thereof are shown in Table 4.

Incidentally, the separator C of Comparative Example 2-1 had been regulated so as to have almost the same areal stretch ratio (about 12) as the separators A and B of Examples 2-1 and 2-2. Because of this, a comparison can be made with respect to the effect of pores on resistance.

Example 2-4

A coin battery (lithium secondary battery of Example 2-4) was produced in the same manner as in Example 2-1, except that vinylene carbonate was not incorporated in preparing the electrolyte solution. This battery was evaluated in the same manner, and the results thereof are shown in Table 4.

Example 2-5

A coin battery (lithium secondary battery of Example 2-5) was produced in the same manner as in Example 2-2, except that vinylene carbonate was not incorporated in preparing the electrolyte solution. This battery was evaluated in the same manner, and the results thereof are shown in Table 4.

Comparative Example 2-2

A coin battery (lithium secondary battery of Comparative Example 2-2) was produced in the same manner as in Example 2-3, except that separator C produced in Comparative Example 2-1 was used as the separator. This battery was evaluated in the same manner, and the results thereof are shown in Table 4.

TABLE 4

| | Kind of separator | Film-forming agent in nonaqueous electrolyte solution | Evaluation results | |
|---|---|---|---|---|
| | | | Cycle retention (%) | Discharge efficiency (%) |
| Example 2-1 | A | vinylene carbonate | 85.1 | 50.2 |
| Example 2-2 | B | vinylene carbonate | 85.3 | 50.0 |
| Example 2-3 | A | vinylethylene carbonate | 82.6 | 50.1 |
| Comparative Example 2-1 | C | vinylene carbonate | 85.1 | 42.7 |
| Example 2-4 | A | none | 71.9 | 53.9 |
| Example 2-5 | B | none | 72.1 | 53.4 |
| Comparative Example 2-2 | C | vinylethylene carbonate | 82.7 | 42.9 |

Table 4 given above clearly shows the following. The lithium secondary batteries of Examples 2-1 to 2-3, which employed a nonaqueous electrolyte solution containing a film-forming agent and a separator made of a thermoplastic resin containing an inorganic filler, were superior in cycle characteristics to Examples 2-4 and 2-5, in which a film-forming agent was not contained. Furthermore, the batteries of Examples 2-1 to 2-3 showed higher low-temperature rate characteristics than Comparative Examples 2-1 and 2-2, which employed a separator obtained by the extraction method which contained no inorganic filler and had a small pore diameter.

Although a nonaqueous electrolyte solution containing a film-forming agent is employed, Comparative Examples 2-1 and 2-2, in which a separator obtained by the extraction method and having a small pore diameter is employed as the separator, have a problem concerning the decrease in low-temperature rate characteristics attributable to the film-forming agent.

As stated above, separator C, which was produced by the extraction method and used in Comparative Examples 2-1 and 2-2, is one obtained by stretching a raw sheet having the same thickness as the raw sheets for separators A and B, which were produced by the interfacial separation method in Examples 2-1 and 2-2, in the same areal stretch ratio (about 12) as these raw sheets. However, these separators considerably differ in average pore diameter; separators A and B respectively have average pore diameters of 0.27 μm and 0.19 μm, while separator C has an average pore diameter of 0.04 μm. Such a large difference in average pore diameter brought about the following results. In Examples 2-1 to 2-3, which employ separators A and B having a large pore diameter, the increase in resistance caused by the film-forming agents is countervailed by the electrical-resistance-reducing effect of the separators, whereby low-temperature rate characteristics are maintained. In contrast, in Comparative Examples 2-1 and 2-2, which employ separator C having a small pore diameter, such an effect is not obtained and the batteries have reduced low-temperature rate characteristics.

Incidentally, in film formation by the extraction method, even when the stretch ratio is increased, the porous film obtained does not have a sufficiently enlarged pore diameter because the increase in stretch ratio results in densification (thickness-direction shrinkage caused by stretching). There are cases where the increase in stretch ratio reduces rather than increases the pore diameter. It is therefore difficult to realize a separator effective in reducing internal battery resistance.

Example 3-1

<Production of Separator>

A hundred parts by weight of high-density polyethylene ["HI-ZEX7000FP" manufactured by Mitsui Chemicals, Inc.; weight-average molecular weight, 200,000; density, 0.956 g/cm$^3$; melt flow rate, 0.04 g/10 min] was mixed with 8.8 parts by weight of flexible polypropylene ["PERR110E" manufactured by Idemitsu Petrochemical Co., Ltd.; weight-average molecular weight, 330,000], 8.8 parts by weight of hardened castor oil ["HY-CASTOR OIL" manufactured by Hokoku Oil Mill Co., Ltd.; molecular weight, 938], and 176.5 parts by weight of barium sulfate [number-average particle diameter, 0.18 μm] as an inorganic filler. The resultant mixture was melt-kneaded. The resin composition obtained was subjected to inflation molding at a temperature of 210° C. to obtain a raw sheet. The thickness of this raw sheet was 105 μm on the average. Subsequently, the raw sheet obtained was subjected to successive stretching in which the sheet was stretched first at 90° C. in the machine direction (MD) 4 times and then at 120° C. in the transverse direction (TD) 2.9 times. Thus, a porous polymer film was obtained which had a film thickness of 26 μm, porosity of 64%, average pore diameter (the average pore diameter as provided for in ASTM F316-86) of 0.27 μm, and Gurley air permeability (the Gurley air permeability as provided for in JIS P8117) of 44 sec/100 cc. This porous polymer film is referred to as separator A. Inorganic-filler shedding from the porous polymer film was not observed during the stretching.

<Preparation of Nonaqueous Electrolyte Solution>

In a dry argon atmosphere, purified ethylene carbonate was mixed with dimethyl carbonate in a ratio of 3:7 by volume to prepare a mixed solvent. Sufficiently dried $LiPF_6$ was dissolved in this mixed solvent in such an amount as to result in a proportion of 1.0 mol/L to thereby obtain a nonaqueous electrolyte solution.

<Production of Positive Electrode>

$LiCoO_2$ was used as a positive-electrode active material. To 85 parts by weight of $LiCoO_2$ were added 6 parts by weight of carbon black and 9 parts by weight of poly(vinylidene fluoride) (trade name "KF-1000" manufactured by Kureha Chemical Industry Co., Ltd.). The ingredients were mixed together and dispersed with N-methyl-2-pyrrolidone to prepare a slurry. This slurry was evenly applied to one side of a 20 μm-thick aluminum foil as a positive-electrode current collector and dried. Thereafter, the coated foil was pressed with a pressing machine so as to result in a positive-electrode active-material layer having a density of 3.0 g/cm$^3$ to thereby obtain a positive electrode.

<Production of Negative Electrode>

A powder of natural graphite which had been sphered (the same graphite as in Example 1-3) was used as a negative-electrode active material. With 94 parts by weight of the powder of natural graphite was mixed 6 parts by weight of poly(vinylidene fluoride). The ingredients were dispersed with N-methyl-2-pyrrolidone to prepare a slurry. This slurry was evenly applied to one side of an 18 μm-thick copper foil as a negative-electrode current collector and dried. Thereafter, the coated foil was pressed with a pressing machine so as to result in a negative-electrode active-material layer having a density of 1.5 g/cm$^3$ to thereby obtain a negative electrode.

<Battery Fabrication>

The separator A, nonaqueous electrolyte solution, positive electrode, and negative electrode were used to produce a cylindrical battery of the 18650 type. Namely, the positive electrode and negative electrode and the separator A interposed between these were wound into a roll to obtain an electrode group, which was put in a battery can. This battery can was sealed. Thereafter, 5 mL of the electrolyte solution was introduced into the battery can having the electrode group packed therein, and was sufficiently infiltrated into the electrodes. This battery can was then caulked.

<Evaluation of Battery>

1) Initial Charge/Discharge

At 25° C., the battery was subjected to 3 cycles of charge/discharge in which the battery was charged and discharged to a final charge voltage of 4.2 V and a final discharge voltage of 3 V, respectively, at a current corresponding to 0.2 C (the current value at which the rated capacity which is the 1-hour-rate discharge capacity is discharged over 1 hour is referred to as 1 C; the same applies hereinafter) to stabilize the battery. In the fourth cycle, the battery was subjected to 4.2-V constant-current constant-voltage charge (CCCV charge) (0.05 C cut) in which the battery was charged to a final charge voltage of 4.2 V at a current corresponding to 0.5 C and charged until the charge current reached the current value corresponding to 0.05 C. Thereafter, the battery was subjected to 3-V discharge at a constant current corresponding to 0.2 C. The final discharge capacity in this operation is taken as initial capacity.

2) Cycle Test

A cycle test was conducted in the following manner. The battery which had undergone the 1) initial charge/discharge was charged by the constant-current constant-voltage method at 2 C to a final charge voltage of 4.2 V and then discharged at a constant current of 2 C to a final discharge voltage of 3.0V. This charge/discharge operation as one cycle was repeated to conduct 500 cycles. This cycle test was conducted at 25° C. After this cycle test, the same charge/discharge as the 1) initial charge/discharge was conducted. The proportion of the final discharge capacity in this operation to the initial capacity is shown as cycle durability in Table 5.

3) Measurement of Amount of Gas Generated

A hole was made in the can of the battery which had undergone the 2) cycle test, and the gas with which the inside of the can had been filled was collected. The volume of this gas ingredient was measured at 25° C. and 1 atm. The results thereof are shown in Table 5.

Example 3-2

A hundred parts by weight of high-density polyethylene ["HI-ZEX7000FP" manufactured by Mitsui Chemicals, Inc.; weight-average molecular weight, 200,000; density, 0.956 g/cm$^3$; melt flow rate, 0.04 g/10 min] was mixed with 8.8 parts by weight of flexible polypropylene ["PERR110E" manufactured by Idemitsu Petrochemical Co., Ltd.; weight-average molecular weight, 330,000], 8.8 parts by weight of hardened castor oil ["HY-CASTOR OIL" manufactured by Hokoku Oil Mill Co., Ltd.; molecular weight, 938], and 117.6 parts by weight of barium sulfate [number-average particle diameter, 0.17 μm] as an inorganic filler. The resultant mixture was melt-kneaded. The resin composition obtained was subjected to inflation molding at a temperature of 210° C. to obtain a raw sheet. The thickness of this raw sheet was 110 μm on the average. Subsequently, the raw sheet obtained was subjected to successive stretching in which the sheet was stretched first at 90° C. in the machine direction (MD) 4 times and then at 120° C, in the transverse direction (TD) 2.9 times. Thus, a porous polymer film was obtained which had a film thickness of 25 μm, porosity of 61%, average pore diameter of 0.19 μm, and Gurley air permeability of 85 sec/100 cc. This porous polymer film is referred to as separator B. Inorganic-filler shedding from the porous polymer film was not observed during the stretching.

A cylindrical battery of the 18650 type (lithium secondary battery of Example 3-2) was produced in the same manner as in Example 3-1, except that separator B was used. This battery was evaluated in the same manner, and the results thereof are shown in Table 5.

Example 3-3

A cylindrical battery of the 18650 type (lithium secondary battery of Example 3-3) was produced in the same manner as in Example 3-1, except that in preparing the nonaqueous electrolyte solution, ethyl methyl carbonate was used in place of the dimethyl carbonate. This battery was evaluated in the same manner, and the results thereof are shown in Table 5.

Comparative Example 3-1

A mixture of 25 parts by weight of a polyethylene having a viscosity-average molecular weight of 1,000,000 and 75 parts by weight of a paraffin wax (average molecular weight, 389) was subjected to extrusion inflation at an extrusion temperature of 170° C. with a twin-screw extruder having a diameter of 40 mm to produce a raw film. The raw film obtained was immersed in 60° C. isopropanol to extract/remove the paraffin wax. The film obtained was longitudinally stretched 2.0 times at a temperature of 90° C. using stretching rolls and then stretched 6.0 times with a tenter at a temperature of 100° C. to obtain a porous film having a film thickness of 22 μm, porosity of 50%, average pore diameter of 0.04 μm, and Gurley air permeability of 440 sec/100 cc. This porous polymer film is referred to as separator C.

A cylindrical battery of the 18650 type (lithium secondary battery of Comparative Example 3-1) was produced in the same manner as in Example 3-1, except that separator C was used. This battery was evaluated in the same manner, and the results thereof are shown in Table 3.

Incidentally, the separator C of Comparative Example 3-1 had been regulated so as to have almost the same areal stretch ratio (about 12) as the separators A and B of Examples 3-1 and 3-2 in order to clearly show the effect of the presence or absence of a filler.

Example 3-4

A cylindrical battery of the 18650 type (lithium secondary battery of Example 3-4) was produced in the same manner as in Example 3-1, except that in preparing the electrolyte solution, diethyl carbonate was used in place of the dimethyl carbonate. This battery was evaluated in the same manner, and the results thereof are shown in Table 5.

Example 3-5

A cylindrical battery of the 18650 type (lithium secondary battery of Example 3-5) was produced in the same manner as in Example3-2, except that in preparing the electrolyte solution, diethyl carbonate was used in place of the dimethyl carbonate. This battery was evaluated in the same manner, and the results thereof are shown in Table 5.

Comparative Example 3-2

A cylindrical battery of the 18650 type (lithium secondary battery of Comparative Example 3-2) was produced in the same manner as in Example 3-3, except that separator C produced in Comparative Example 3-1 was used as the separator. This battery was evaluated in the same manner, and the results thereof are shown in Table 5.

TABLE 5

| | Nonaqueous solvent of nonaqueous electrolyte solution | Kind of separator (presence or absence of inorganic filler) | Evaluation results | |
|---|---|---|---|---|
| | | | Cycle durability (%) | Amount of gas generated (mL) |
| Ex. 3-1 | ethylene carbonate + dimethyl carbonate | A (present) | 81.1 | 1.72 |
| Ex. 3-2 | | B (present) | 81.3 | 1.81 |
| Comp. Ex. 3-1 | | C (absent) | 81.1 | 3.64 |
| Ex. 3-3 | ethylene carbonate + ethyl methyl carbonate | A (present) | 81.2 | 1.57 |
| Comp. Ex. 3-2 | | C (absent) | 81.1 | 3.42 |
| Ex. 3-4 | ethylene carbonate + diethyl carbonate | A (present) | 75.4 | 1.55 |
| Ex. 3-5 | | B (present) | 75.5 | 1.60 |

Table 5 given above clearly shows the following. The lithium secondary batteries of Examples 3-1 to 3-3, which employ a nonaqueous electrolyte solution containing dimethyl carbonate or ethyl methyl carbonate and employ a separator made of a thermoplastic resin containing an inorganic filler, are superior in cycle characteristics to Examples 3-4 and 3-5, in which neither dimethyl carbonate nor ethyl methyl carbonate is contained. Furthermore, the batteries of Examples 3-1 to 3-3 generate a far smaller amount of a gas than the batteries of Comparative Examples 3-1 and 3-2, which employ a separator containing no inorganic filler.

Although a nonaqueous electrolyte solution containing dimethyl carbonate or ethyl methyl carbonate is employed, Comparative Examples 3-1 and 3-2, in which a separator containing no inorganic filler is employed as the separator, have a problem concerning gas generation attributable to the dimethyl carbonate or ethyl methyl carbonate.

Example 4-1

<Production of Separator>

A hundred parts by weight of high-density polyethylene ["HI-ZEX7000FP" manufactured by Mitsui Chemicals, Inc.; weight-average molecular weight, 200,000; density, 0.956 g/cm$^3$; melt flow rate, 0.04 g/10 min] was mixed with 8.8 parts by weight of flexible polypropylene ["PERR110E" manufactured by Idemitsu Petrochemical Co., Ltd.; weight-average molecular weight, 330,000], 8.8 parts by weight of hardened castor oil ["HY-CASTOR OIL" manufactured by Hokoku Oil Mill Co., Ltd.; molecular weight, 938], and 176.5 parts by weight of barium sulfate [number-average particle diameter, 0.18 μm] as an inorganic filler. The resultant mixture was melt-kneaded. The resin composition obtained was subjected to inflation molding at a temperature of 210° C. to obtain a raw sheet. The thickness of this raw sheet was 105 μm on the average. Subsequently, the raw sheet obtained was subjected to successive stretching in which the sheet was stretched first at 90° C. in the machine direction (MD) 4 times and then at 120° C. in the transverse direction (TD) 2.9 times. Thus, a porous polymer film was obtained which had a film thickness of 26 μm, porosity of 64%, average pore diameter (the average pore diameter as provided for in ASTM F316-86) of 0.27 μm, and Gurley air permeability (the Gurley air permeability as provided for in JIS P8117) of 44 sec/100 cc. This porous polymer film is referred to as separator A. Inorganic-filler shedding from the porous polymer film was not observed during the stretching.

<Preparation of Nonaqueous Electrolyte Solution>

In a dry argon atmosphere, purified ethylene carbonate was mixed with diethyl carbonate in a ratio of 3:7 by volume to prepare a mixed solvent. Sufficiently dried LiPF$_6$ was dissolved in this mixed solvent in such an amount as to result in a proportion of 1.0 mol/L. Thereafter, cyclohexylbenzene (CHB) was mixed therewith in such an amount as to result in a concentration in the resultant nonaqueous electrolyte solution of 2% by weight to thereby obtain a nonaqueous electrolyte solution. Incidentally, CHB showed an exothermic property of 2.5 in the test for determining exothermic property described above.

<Production of Positive Electrode>

LiCoO$_2$ was used as a positive-electrode active material. To 85 parts by weight of LiCoO$_2$ were added 6 parts by weight of carbon black and 9 parts by weight of poly(vinylidene fluoride) (trade name "KF-1000" manufactured by Kureha Chemical Industry Co., Ltd.). The ingredients were mixed together and dispersed with N-methyl-2-pyrrolidone to prepare a slurry. This slurry was evenly applied to one side of a 20 μm-thick aluminum foil as a positive-electrode current collector and dried. Thereafter, the coated foil was pressed with a pressing machine so as to result in a positive-electrode active-material layer having a density of 3.0 g/cm$^3$ to thereby obtain a positive electrode.

\<Production of Negative Electrode\>

A powder of natural graphite which had been sphered (the same graphite as in Example 1-3) was used as a negative-electrode active material. With 94 parts by weight of the powder of natural graphite was mixed 6 parts by weight of poly(vinylidene fluoride). The ingredients were dispersed with N-methyl-2-pyrrolidone to prepare a slurry. This slurry was evenly applied to one side of an 18 µm-thick copper foil as a negative-electrode current collector and dried. Thereafter, the coated foil was pressed with a pressing machine so as to result in a negative-electrode active-material layer having a density of 1.5 g/cm$^3$ to thereby obtain a negative electrode.

\<Battery Fabrication\>

The negative-electrode plate and positive-electrode plate produced in the manners described above were superposed together with separator A and rolled up. The outermost lap was fastened with a tape to obtain a spirally wound electrode structure. This electrode structure was inserted into a cylindrical stainless-steel battery case through its opening. Thereafter, a negative-electrode lead connected to the negative electrode of the electrode structure was welded to the inner surface of the battery case bottom, and a positive-electrode lead connected to the positive electrode of the electrode structure was welded to the bottom of a circuit breaker, which works when the gas pressure in the battery increase to or above a given value. An explanation-proof valve and the circuit breaker were attached to the bottom of a battery cover. Thereafter, the electrolyte solution was introduced into the battery case, and the opening of the battery case was closed and sealed with the battery cover and an insulating gasket made of polypropylene (PP). Thus, a lithium secondary battery of Example 4-1 was produced.

\<Evaluation of Battery\>

1) Initial Charge/Discharge

At 25° C., the battery was subjected to 3 cycles of charge/discharge in which the battery was charged and discharged to a final charge voltage of 4.2 V and a final discharge voltage of 3 V, respectively, at a current corresponding to 0.2 C (the current value at which the rated capacity which is the 1-hour-rate discharge capacity is discharged over 1 hour is referred to as 1 C, the same applies hereinafter) to stabilize the battery. In the fourth cycle, the battery was subjected to 4.2-V constant-current constant-voltage charge (CCCV charge) (0.05 C cut) in which the battery was charged to a final charge voltage of 4.2 V at a current corresponding to 0.5 C and charged until the charge current reached the current value corresponding to 0.05 C. Thereafter, the battery was subjected to 3-V discharge at a constant current corresponding to 1 C. The discharge capacity in this discharge is shown in Table 6 as capacity before storage.

2) Overcharge Test

The batteries which had undergone the 1) initial charge/discharge were fully charged by charging them at 25° C. and a constant current of 1 C to a final charge voltage of 4.2 V and then conducting constant-voltage charge for 2.5 hours. Thereafter, an overcharge test was further conducted in which the batteries were charged at a constant current of 1 C to measure the time period required for the circuit breaker to work after the initiation of current flowing and further measure the maximum temperature of each battery in this operation. The batteries in which the time period required for the circuit breaker to work (circuit breakage time) is short and the maximum temperature is low are regarded as excellent in battery safety in overcharge. The results of this test are shown in Table 6.

3) High-Temperature Storage Test

The battery which had undergone the 1) initial charge/discharge was fully charged by charging it at 25° C. and a constant current corresponding to 1 C to a final charge voltage of 4.2 V and then conducting constant-voltage charge for 2.5 hours. This battery was stored in a 60° C. environment for 30 days. The battery after the storage was discharged to 3 V at 25° C. and a current corresponding to 0.2 C, subsequently subjected to the same 4.2-V CCCV charge as the initial one, and then subjected to 3-V discharge at a current corresponding to 1 C. The discharge capacity in this discharge is shown in Table 6 as capacity after storage.

Example 4-2

A hundred parts by weight of high-density polyethylene ["HI-ZEX7000FP" manufactured by Mitsui Chemicals, Inc.; weight-average molecular weight, 200,000; density, 0.956 g/cm$^3$; melt flow rate, 0.04 g/10 min] was mixed with 8.8 parts by weight of flexible polypropylene ["PERR110E" manufactured by Idemitsu Petrochemical Co., Ltd.; weight-average molecular weight, 330,000], 8.8 parts by weight of hardened castor oil ["HY-CASTOR OIL" manufactured by Hokoku Oil Mill Co., Ltd.; molecular weight, 938], and 117.6 parts by weight of barium sulfate [number-average particle diameter, 0.17 µm] as an inorganic filler. The resultant mixture was melt-kneaded. The resin composition obtained was subjected to inflation molding at a temperature of 210° C. to obtain a raw sheet. The thickness of this raw sheet was 110 µm on the average. Subsequently, the raw sheet obtained was subjected to successive stretching in which the sheet was stretched first at 90° C. in the machine direction (MD) 4 times and then at 120° C. in the transverse direction (TD) 2.9 times. Thus, a porous polymer film was obtained which had a film thickness of 25 µm, porosity of 61%, average pore diameter of 0.19 µm, and Gurley air permeability of 85 sec/100 cc. This porous polymer film is referred to as separator B. Inorganic-filler shedding from the porous polymer film was not observed during the stretching.

A cylindrical battery (lithium secondary battery of Example 4-2) was produced in the same manner as in Example 4-1, except that separator B was used. This battery was evaluated in the same manner, and the results thereof are shown in Table 6.

Example 4-3

A cylindrical battery (lithium secondary battery of Example 4-3) was produced in the same manner as in Example 4-1, except that in preparing the nonaqueous electrolyte solution, CHB was incorporated in such an amount as to result in a concentration in the nonaqueous electrolyte solution of 3% by weight. This battery was evaluated in the same manner, and the results thereof are shown in Table 6.

Example 4-4

A cylindrical battery (lithium secondary battery of Example 4-4) was produced in the same manner as in Example 4-1, except that in preparing the nonaqueous electrolyte solution, CHB was incorporated in such an amount as to result in a concentration in the nonaqueous electrolyte solution of 1% by weight. This battery was evaluated in the same manner, and the results thereof are shown in Table 6.

Example 4-5

A cylindrical battery (lithium secondary battery of Example 4-5) was produced in the same manner as in Example 4-1, except that in preparing the nonaqueous electrolyte solution, biphenyl (BP) was used in place of the CHB. This battery was evaluated in the same manner, and the results thereof are shown in Table 6. Incidentally, BP showed an exothermic property of 3.3 in the test for determining exothermic property described above.

Example 4-6

A cylindrical battery (lithium secondary battery of Example 4-6) was produced in the same manner as in Example 4-5, except that separator B was used as the separator. This battery was evaluated in the same manner, and the results thereof are shown in Table 6.

Comparative Example 4-1

A mixture of 25 parts by weight of a polyethylene having a viscosity-average molecular weight of 1,000,000 and 75 parts by weight of a paraffin wax (average molecular weight, 389) was subjected to extrusion inflation at an extrusion temperature of 170° C. with a twin-screw extruder having a diameter of 40 mm to produce a raw film. The raw film obtained was immersed in 60° C. isopropanol to extract/remove the paraffin wax. The film obtained was longitudinally stretched 2.0 times at a temperature of 90° C. using stretching rolls and then stretched 6.0 times with a tenter at a temperature of 100° C. to obtain a porous film having a film thickness of 22 μm, porosity of 50%, average pore diameter of 0.04 μ, and Gurley air permeability of 440 sec/100 cc. This porous polymer film is referred to as separator C.

A cylindrical battery (lithium secondary battery of Comparative Example 4-1) was produced in the same manner as in Example 4-1, except that separator C was used as the separator. This battery was evaluated in the same manner, and the results thereof are shown in Table 6.

Incidentally, the separator C of Comparative Example 4-1 had been regulated so as to have almost the same areal stretch ratio (about 12) as the separators A and B of Examples 4-1 and 4-2 in order to clearly show the effect of the presence or absence of a filler.

Comparative Example 4-2

A cylindrical battery (lithium secondary battery of Comparative Example 4-2) was produced in the same manner as in Example 4-5, except that separator C was used as the separator. This battery was evaluated in the same manner, and the results thereof are shown in Table 6.

Example 4-7

A cylindrical battery (lithium secondary battery of Example 4-7) was produced in the same manner as in Example 4-1, except that CHB was not added in preparing the nonaqueous electrolyte solution. This battery was evaluated in the same manner, and the results thereof are shown in Table 6.

Comparative Example 4-3

A cylindrical battery (lithium secondary battery of Comparative Example 4-3) was produced in the same manner as in Example 4-1, except that in preparing the nonaqueous electrolyte solution, 2,4-difluoroanisole (DFA) was used in place of the CHB. This battery was evaluated in the same manner, and the results thereof are shown in Table 6.

Incidentally, DFA showed an exothermic property of 0.5 in the test for determining exothermic property described above.

TABLE 6

| Example | Aromatic compound Kind | Concentration in nonaqueous electrolyte solution (wt %) | Kind of separator | High-temperature storability Capacity before storage (mAh) | Capacity after storage (mAh) | Stability during overcharge Circuit breakage time (min) | Maximum temperature (° C.) |
|---|---|---|---|---|---|---|---|
| Ex. 4-1 | CHB | 2 | A | 1500 | 1328 | 46 | 80 |
| Ex. 4-2 | CHB | 2 | B | 1502 | 1321 | 45 | 80 |
| Comp. Ex. 4-1 | CHB | 2 | C | 1500 | 1261 | 45 | 81 |
| Ex. 4-3 | CHB | 3 | A | 1499 | 1319 | 43 | 79 |
| Ex. 4-4 | CHB | 1 | A | 1501 | 1337 | 47 | 81 |
| Ex. 4-5 | BP | 2 | A | 1500 | 1325 | 47 | 81 |
| Ex. 4-6 | BP | 2 | B | 1502 | 1320 | 46 | 81 |
| Comp. Ex. 4-2 | BP | 2 | C | 1500 | 1260 | 46 | 82 |
| Ex. 4-7 | — | — | A | 1501 | 1332 | 56 | rupture |
| Comp. Ex. 4-3 | DFA | 2 | A | 1502 | 1329 | 55 | rupture |

Table 6 given above clearly shows the following. All the lithium secondary batteries employing a nonaqueous electrolyte solution containing an aromatic compound having an exothermic property of 1.5 or higher were satisfactory in safety during overcharge. Among these batteries, however, the lithium secondary batteries of Examples 4-1 to 4-7, which employ a separator made of a thermoplastic resin containing an inorganic filler, further show satisfactory high-temperature storability, whereas the batteries of Comparative Examples 4-1 and 4-2, which employ a separator obtained by the extraction method which contains no inorganic filler and has a small pore diameter, are inferior in the property after high-temperature storage to Examples 4-1 to 4-7.

Namely, in Comparative Examples 4-1 and 4-2, which employ a separator containing no inorganic filler, there is a problem that high-temperature storability decreases due to the separator clogging caused by a polymer of the aromatic compound as an overcharge inhibitor.

This decrease in high-temperature storability is caused by the incorporation of an aromatic compound having an exothermic property of 1.5 or higher into the nonaqueous electrolyte solution. Although Example 4-7, which employs a nonaqueous electrolyte solution containing no aromatic compound, is almost free from the problem concerning the decrease in high-temperature storability, this battery is inferior in safety during overcharge because of the absence of an aromatic compound.

As stated above, separator C, which was produced by the extraction method and used in Comparative Examples 4-1 and 4-2, is one obtained by stretching a raw sheet having the same thickness as the raw sheets for separators A and B, which were produced by the interfacial separation method in Examples 4-1 to 4-7, in the same areal stretch ratio (about 12) as these raw sheets. However, these separators considerably differ in average pore diameter; separators A and B respectively have average pore diameters of 0.27 μm and 0.19 μm, while separator C has an average pore diameter of 0.04 μm. Such a large difference in average pore diameter brought about the following results. In Examples 4-1 to 4-7, which employ separators A and B having a large pore diameter, the clogging by a polymer of the overcharge inhibitor is inhibited, whereby high-temperature storability is maintained. In contrast, in Comparative Examples 4-1 and 4-2, which employ separator C having a small pore diameter, such an effect is not obtained and the batteries have reduced high-temperature storability.

Furthermore, it is thought that separators A and B, which contain an inorganic filler, are inhibited from being oxidized as stated above and, hence, the overcharge inhibitor is inhibited from undergoing polymerization reaction during high-temperature storage. This also is thought to be a factor contributing to the retention of high-temperature storability.

Incidentally, in film formation by the extraction method, even when the stretch ratio is increased, the porous film obtained does not have a sufficiently enlarged pore diameter because the increase in stretch ratio results in densification (thickness-direction shrinkage caused by stretching). There are cases where the increase in stretch ratio reduces rather than increases the pore diameter. It is therefore difficult to realize a separator effectively prevented from being clogged.

Example 5-1

A battery was produced in the following manner.
<Production of Separator>
A hundred parts by weight of high-density polyethylene ["HI-ZEX7000FP" manufactured by Mitsui Chemicals, Inc.; weight-average molecular weight, 200,000; density, 0.956 g/cm³; melt flow rate, 0.04 g/10 min] was mixed with 8.8 parts by weight of flexible polypropylene ["PERR110E" manufactured by Idemitsu Petrochemical Co., Ltd.; weight-average molecular weight, 330,000], 8.8 parts by weight of hardened castor oil ["HY-CASTOR OIL" manufactured by Hokoku Oil Mill Co., Ltd.; molecular weight, 938], and 176.5 parts by weight of barium sulfate [number-average particle diameter, 0.18 μm] as an inorganic filler. The resultant mixture was melt-kneaded. The resin composition obtained was subjected to inflation molding at a temperature of 210° C. to obtain a raw sheet. The thickness of this raw sheet was 105 μm on the average.

Subsequently, the raw sheet obtained was subjected to successive stretching in which the sheet was stretched first at 90° C. in the machine direction (MD) 4 times and then at 120° C. in the transverse direction (TD) 2.9 times. Thus, a porous polymer film was obtained which had a film thickness of 26 μm, porosity of 64%, average pore diameter (the average pore diameter as provided for in ASTM F316-86) of 0.27 μm, and Gurley air permeability (the Gurley air permeability as provided for in JIS P8117) of 44 sec/100 cc. This porous polymer film is referred to as separator A. Inorganic-filler shedding from the porous polymer film was not observed during the stretching.

This separator A was dried under the drying conditions shown in Table 7 to obtain a separator having the water content shown in Table 7.
<Preparation of Nonaqueous Electrolyte Solution>
In a dry argon atmosphere, purified ethylene carbonate was mixed with diethyl carbonate in a ratio of 3:7 by volume to prepare a mixed solvent. Sufficiently dried $LiPF_6$ was dissolved in this mixed solvent in such an amount as to result in a proportion of 1.0 mol/L to thereby obtain a nonaqueous electrolyte solution. This electrolyte solution had a water content of 40 ppm.
<Production of Positive Electrode>
$LiCoO_2$ was used as a positive-electrode active material. To 85 parts by weight of $LiCoO_2$ were added 6 parts by weight of carbon black and 9 parts by weight of poly(vinylidene fluoride) (trade name "KF-1000" manufactured by Kureha Chemical Industry Co., Ltd.). The ingredients were mixed together and dispersed with N-methyl-2-pyrrolidone to prepare a slurry. This slurry was evenly applied to one side of a 20 μm-thick aluminum foil as a positive-electrode current collector and dried. Thereafter, the coated foil was pressed with a pressing machine so as to result in a positive-electrode active-material layer having a density of 3.0 g/cm³ to thereby obtain a positive electrode. Drying conditions for the positive electrode and the water content of the positive electrode obtained are shown in Table 1.
<Production of Negative Electrode>
A powder of natural graphite which had been sphered (the same graphite as in Example 1-3) was used as a negative-electrode active material. With 94 parts by weight of the powder of natural graphite was mixed 6 parts by weight of poly(vinylidene fluoride). The ingredients were dispersed with N-methyl-2-pyrrolidone to prepare a slurry. This slurry was evenly applied to one side of an 18 μm-thick copper foil as a negative-electrode current collector and dried. Thereafter, the coated foil was pressed with a pressing machine so as to result in a negative-electrode active-material layer having a density of 1.5 g/cm³ to thereby obtain a negative electrode. Drying conditions for the negative electrode and the water content of the negative electrode obtained are shown in Table 7.
<Battery Fabrication>
The separator, nonaqueous electrolyte solution, positive electrode, and negative electrode were used to produce a cylindrical battery of the 18650 type. Namely, the positive electrode and negative electrode and the separator interposed between these were wound into a roll to obtain an electrode group, which was put in a battery can. This battery can was sealed. Thereafter, 4.5 g of the electrolyte solution was introduced into the battery can having the electrode group packed therein, and was sufficiently infiltrated into the electrodes. This battery can was then caulked.

Examples 5-2, 5-3, 5-4, and 5-5

Batteries were produced in the same manner as in Example 5-1, except that the separator drying conditions were changed as shown in Table 7 (provided that the drying was omitted in Example 5-5) to obtain separators respectively having the water contents shown in Table 7.

Example 5-6

A battery was produced in the same manner as in Example 5-1, except that the separator was replaced by the separator B produced by the following method.

<Production of Separator B>

A mixture of 25 parts by weight of a polyethylene having a viscosity-average molecular weight of 1,000,000 and 75 parts by weight of a paraffin wax (average molecular weight, 389) was subjected to extrusion inflation at an extrusion temperature of 170° C. with a twin-screw extruder having a diameter of 40 mm to produce a raw film. The raw film obtained was immersed in 60° C. isopropanol to extract/remove the paraffin wax. The film obtained was longitudinally stretched 2.0 times at a temperature of 90° C. using stretching rolls and then stretched 6.0 times with a tenter at a temperature of 100° C. to obtain a porous film having a film thickness of 22 μm, porosity of 50%, average pore diameter of 0.04 μm, and Gurley air permeability of 440 sec/100 cc. This porous polymer film is referred to as separator B.

The separator B was dried under the drying conditions shown in Table 7 to obtain a separator having the water content shown in Table 7.

The batteries obtained in Examples 5-1 to 5-6 each were subjected to the following evaluations, and the results thereof are shown in Table 8. The trickle charge test was conducted only for the batteries of Example 5-2 and Example 5-6, and the results thereof are shown in Table 9.

Furthermore, each battery was disassembled at 12 hours after the fabrication and the electrolyte solution was taken out and examined for water concentration by the water amount measurement method described above. The water concentrations measured are shown in Table 8.

<Evaluation of Battery>

1) Initial Charge/Discharge

At 25° C., the battery was subjected to 3 cycles of charge/discharge in which the battery was charged and discharged to a final charge voltage of 4.2 V and a final discharge voltage of 3 V, respectively, at a current corresponding to 0.2 C (the current value at which the rated capacity which is the 1-hour-rate discharge capacity is discharged over 1 hour is referred to as 1 C; the same applies hereinafter) to stabilize the battery. In the fourth cycle, the battery was subjected to 4.2-V constant-current constant-voltage charge (CCCV charge) (0.05 C cut) in which the battery was charged to a final charge voltage of 4.2 V at a current corresponding to 0.5 C and charged until the charge current reached the current value corresponding to 0.05 C. Thereafter, the battery was subjected to 3-V discharge at a constant current corresponding to 0.2 C.

2) Surface Resistance Measurement

The battery which had undergone the 1) initial charge/discharge was subjected at 25° C. to 4.2-V constant-current constant-voltage charge (CCCV charge) (0.05 C cut) in which the battery was charged to a final charge voltage of 4.2 V at a current corresponding to 0.5 C and charged until the charge current reached a value corresponding to 0.05 C. Thereafter, the electrode surface resistance was determined by the alternating-current impedance method. The results thereof are shown in Table 8. The measurement was made at a temperature of 25° C. and frequencies ranging from 20 kHz to 0.01 Hz and at an applied voltage of 10 mV. A measurement by the alternating-current impedance method is described in, e.g., JP-A-9-117001.

3) Rate Characteristics Examination

The battery which had been examined for the 2) surface resistance was subjected to 3-V discharge at 25° C. and a constant current corresponding to 0.2 C. Subsequently, the battery was subjected to 4.2-V constant-current constant-voltage charge (CCCV charge) (0.05 C cut) in which the battery was charged at a current corresponding to 0.5 C to a final charge voltage of 4.2 V and charged until the charge current reached a value corresponding to 0.05 C. Thereafter, 3-V discharge was conducted at a constant current corresponding to 0.2 C. The discharge capacity in this discharge is shown in Table 8. Furthermore, the battery charged likewise was subjected to 3-V discharge at a constant current corresponding to 2 C, and the proportion of the discharge capacity in this discharge to that discharge capacity as a reference is shown in Table 8 as discharge efficiency.

4) Trickle Charge Test

The battery which had undergone the 1) initial charge/discharge was subjected at 25° C. to 4.2-V constant-current constant-voltage charge (CCCV charge) (0.05 C cut) in which the battery was charged at a current corresponding to 0.5 C to a final charge voltage of 4.2 V and charged until the charge current reached a value corresponding to 0.05 C. Subsequently, the battery charged was placed in a 60° C. atmosphere for 672 hours and subjected to 4.2-V continuous CCCV charge in order to compensate for the voltage decrease caused by self-discharge. Thus, the battery was examined for changes in self-discharge with the lapse of time, based on changes in current in the constant-voltage charge. The results thereof are shown in Table 9.

TABLE 7

| | | Separator | | Positive electrode | | Negative electrode | |
|---|---|---|---|---|---|---|---|
| | Kind | Drying conditions | Water amount (ppm) | Drying conditions | Water amount (ppm) | Drying conditions | Water amount (ppm) |
| Ex. 5-1 | A | 85° C./72 hr vacuum drying | 160 | 120° C./72 hr vacuum drying | 25 | 120° C./72 hr vacuum drying | 25 |
| Ex. 5-2 | A | 85° C./24 hr vacuum drying | 300 | 120° C./72 hr vacuum drying | 25 | 120° C./72 hr vacuum drying | 25 |
| Ex. 5-3 | A | 60° C./24 hr vacuum drying | 750 | 120° C./72 hr vacuum drying | 25 | 120° C./72 hr vacuum drying | 25 |
| Ex. 5-4 | A | 85° C./120 hr vacuum drying | 30 | 120° C./72 hr vacuum drying | 25 | 120° C./72 hr vacuum drying | 25 |
| Ex. 5-5 | A | no drying | 1100 | 120° C./72 hr vacuum drying | 25 | 120° C./72 hr vacuum drying | 25 |
| Ex. 5-6 | B | 85° C./24 hr vacuum drying | 30 | 120° C./72 hr vacuum drying | 25 | 120° C./72 hr vacuum drying | 25 |

TABLE 8

|  | Total water concentration in electrolyte solution (ppm) | Electrode surface resistance ($\Omega \cdot cm^2$) | Discharge capacity (mAh/g) | Discharge efficiency (%) |
| --- | --- | --- | --- | --- |
| Ex. 5-1 | 230 | 28.3 | 136 | 82 |
| Ex. 5-2 | 278 | 25.5 | 135 | 83 |
| Ex. 5-3 | 433 | 19.1 | 132 | 86 |
| Ex. 5-4 | 185 | 34.0 | 136 | 75 |
| Ex. 5-5 | 554 | 18.8 | 128 | 86 |
| Ex. 5-6 | 181 | 32.5 | 136 | 75 |

TABLE 9

| | Lapse of time (hr) | Example 5-2 | Example 5-6 |
| --- | --- | --- | --- |
| Current in continuous charge ($\mu A$) | 1 | 7.1 | 6.3 |
| | 100 | 1.9 | 2.7 |
| | 200 | 2.3 | 49.4 |
| | 300 | 2.0 | 80.2 |
| | 400 | 2.9 | 63.5 |
| | 500 | 1.6 | 56.5 |
| | 600 | 1.6 | 53.4 |
| | 672 | 1.4 | 48.5 |

It can be seen from Tables 7 to 9 that as long as the specific separator is employed and an electrolyte solution prepared so as to have a water concentration of 200-500 ppm is employed, better secondary batteries are obtained which have excellent load characteristics and are free from the problem of deterioration by trickle charge.

While the invention has been described in detail and with reference to specific embodiments thereof, it will be apparent to one skilled in the art that various changes and modifications can be made therein without departing from the spirit and scope thereof.

This application is based on a Japanese patent application filed on Dec. 15, 2003 (Application No. 2003-416761), Japanese patent application filed on Dec. 15, 2003 (Application No. 2003-416762), Japanese patent application filed on Feb. 10, 2004 (Application No. 2004-33617), Japanese patent application filed on Feb. 10, 2004 (Application No. 2004-33618), and Japanese patent application filed on Feb. 10, 2004 (Application No. 2004-33619), the entire contents thereof being herein incorporated by reference.

Industrial Applicability

Applications of the lithium secondary battery of the invention are not particularly limited and the battery is usable is known various applications. Examples thereof include small appliances such as notebook type personal computers, pen-input personal computers, mobile personal computers, electronic book players, portable telephones, portable facsimile telegraphs, portable copiers, portable printers, headphone stereos, video movies, liquid-crystal televisions, handy cleaners, portable CDs, mini disks, transceivers, electronic pocketbooks, pocket calculators, memory cards, portable tape recorders, radios, backup power sources, motors, illuminators, toys, game appliances, clocks, stroboscopes, and cameras and large appliances such as electric motor cars and hybrid motor vehicles.

In particular, since the lithium secondary battery of the invention attains a high capacity and has excellent cycle characteristics, it produces highly excellent effects in applications where a high capacity is required and the battery is repeatedly used, such as various information communication terminals and mobile appliances.

Since the lithium secondary battery of the invention has excellent cycle characteristics and high low-temperature rate characteristics, it produces exceedingly high effects in applications where the battery is repeatedly used in an environment having large differences in temperature.

Furthermore, since the lithium secondary battery of the invention is highly safe against overcharge and has high high-temperature storability, it is effective especially in applications where the battery is used under relatively high-temperature conditions.

Moreover, the lithium secondary battery of the invention is effective in preventing the deterioration caused by the so-called trickle charge, which is used for compensating for a capacity decrease resulting from self-discharge in batteries for personal computers or the like. The battery is hence useful as a secondary battery for personal computers.

The invention claimed is:

1. A nonaqueous-electrolyte secondary battery comprising a negative electrode and a positive electrode each capable of occluding/releasing lithium, a separator, and a nonaqueous electrolyte solution comprising a nonaqueous solvent and a lithium salt, wherein the separator comprises a porous film made of a thermoplastic resin containing an inorganic filler, and at least either of the following is satisfied: the active material contained in the negative electrode is a particulate active material having an aspect ratio of from 1.02 to 3; or the active material contained in the positive electrode is a particulate active material having an aspect ratio of from 1.02 to 1.5, and wherein the porous film of the separator is obtained by a process comprising:

at least one of mixing, melting and kneading a resin mixture comprising the inorganic filler, the thermoplastic resin and an antioxidant, to form a resin composition;

forming a resin sheet from the resin composition; and stretching the resin sheet to form the porous film, and wherein the inorganic filler is at least one of barium sulfate and alumina and is present in the porous film in an amount of 100 parts by weight or more per 100 parts by weight of the thermoplastic resin, wherein when the electrolyte solution comprises a mixed nonaqueous solvent solution obtained by dissolving $LiPF_6$ into a mixed nonaqueous solution comprising ethylene carbonate and ethyl methyl carbonate in a volumetric ratio of 3:7 and contains $LiPF_6$ at a concentration of 1 M, the filler achieves a lithium ion concentration of more than 0.75 mmol/g in the electrolyte solution after adding the filler thereto at a ratio of 0.5 g to 1 ml of the electrolyte solution, and then retaining the electrolyte solution at 85° C. for 72 hours.

2. The nonaqueous-electrolyte secondary battery according to claim 1, wherein the negative-electrode active material has a tap density of 0.7 g/cm³ or higher.

3. The nonaqueous-electrolyte secondary battery according to claim 1, wherein the negative-electrode active material is a carbon material.

4. The nonaqueous-electrolyte secondary battery according to claim 1, wherein the positive-electrode active material has a tap density of 1.4 g/cm³ or higher.

5. The nonaqueous-electrolyte secondary battery according to claim 1, wherein the positive-electrode active material is a lithium/transition metal composite oxide.

6. The nonaqueous-electrolyte secondary battery according to claim 1, wherein the separator has a thickness of from 5 μm to 100 μm, a porosity of from 30% to 80%, an average pore diameter as provided for in ASTM F316-86 of from 0.05 µm to 10 µm, a Gurley air permeability as provided for in JIS P8117 of from 20 sec/100 cc to 700 sec/100 cc, and an average rate of change in retained-liquid amount of 15%/min or lower.

7. The nonaqueous-electrolyte secondary battery according to claim 1, wherein the nonaqueous electrolyte solution contains a film-forming agent.

8. The nonaqueous-electrolyte secondary battery according to claim 7, wherein the film-forming agent comprises at least one member selected from the group consisting of carbonates having an ethylenically unsaturated bond and carboxylic acid anhydrides.

9. The nonaqueous-electrolyte secondary battery according to claim 7, wherein the content of the film-forming agent in the nonaqueous electrolyte solution is 0.01-10% by weight.

10. The nonaqueous-electrolyte secondary battery according to claim 7, wherein the film-forming agent is vinylene carbonate.

11. The nonaqueous-electrolyte secondary battery according to claim 1, wherein the nonaqueous electrolyte solution contains at least one chain carbonate represented by the following formula (I):

ROCOOCH₃     (I)

(wherein R represents a methyl group or an ethyl group).

12. The nonaqueous-electrolyte secondary battery according to claim 11, wherein the lithium salt is a fluorine-containing lithium salt and the nonaqueous solvent contains at least one cyclic carbonate.

13. The nonaqueous-electrolyte secondary battery according to claim 11, wherein the content of the chain carbonate represented by formula (I) in the nonaqueous electrolyte solution is 5-95% by volume.

14. The nonaqueous-electrolyte secondary battery according to claim 1, wherein the nonaqueous electrolyte solution contains at least one aromatic compound having an exothermic property of 1.5 or higher.

15. The nonaqueous-electrolyte secondary battery according to claim 14, wherein the aromatic compound having an exothermic property of 1.5 or higher is at least one member selected from the group consisting of cyclohexylbenzene, cyclohexylfluorobenzene, biphenyl, fluorobiphenyl, and diphenyl ether.

16. The nonaqueous-electrolyte secondary battery according to claim 14, wherein the aromatic compound having an exothermic property of 1.5 or higher is contained in an amount of 0.1-8% by weight based on the nonaqueous electrolyte solution.

17. The nonaqueous-electrolyte secondary battery according to claim 1, wherein the amount of water contained in the battery is 200-500 ppm in terms of water concentration in the electrolyte solution in the battery.

18. The nonaqueous-electrolyte secondary battery according to claim 1, wherein the negative-electrode active material is a carbon material;
wherein the separator is a porous film comprising a polypropylene and barium sulfate, and wherein the separator has an average pore diameter of from 0.19 to 0.27 µm.

19. The nonaqueous-electrolyte secondary battery according to claim 1, wherein the negative-electrode is a carbon material;
wherein the inorganic filler is barium sulfate; and
wherein the separator comprises a polyethylene and a polypropylene.

20. The nonaqueous-electrolyte secondary battery according to claim 1, having a cycle durability of 80.3-81.7%.

21. The nonaqueous-electrolyte secondary battery according to claim 1, wherein the inorganic filler comprises barium.

22. The nonaqueous-electrolyte secondary battery according to claim 1, wherein the inorganic filler is surface-treated with at least one of a fatty acid, a polysiloxane coupling agent and a silane coupling agent.

23. The nonaqueous-electrolyte secondary battery according to claim 1, wherein the inorganic filler comprises barium sulfate.

24. The nonaqueous-electrolyte secondary battery according to claim 1, wherein the inorganic filler is barium sulfate.

25. The nonaqueous-electrolyte secondary battery according to claim 1, wherein the positive electrode particulate active material has an aspect ratio of 1.02-1.3.

26. The nonaqueous-electrolyte secondary battery according to claim 1, wherein the positive electrode particulate active material has an aspect ratio of 1.02-1.4.

* * * * *